US012271034B2

(12) United States Patent
Petersen et al.

(10) Patent No.: US 12,271,034 B2
(45) Date of Patent: *Apr. 8, 2025

(54) TERMINATING A CABLE ASSEMBLY WITH CONNECTORIZED PIGTAILS

(71) Applicant: COMMSCOPE TECHNOLOGIES LLC, Hickory, NC (US)

(72) Inventors: Cyle D. Petersen, Belle Plaine, MN (US); John Paul Anderson, Eden Prairie, MN (US); Thomas Marcouiller, Shakopee, MN (US); Kenneth Allen Skluzacek, Belle Plaine, MN (US); Jonathan R. Kaml, Shakopee, MN (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,111

(22) Filed: Mar. 19, 2024

(65) Prior Publication Data

US 2024/0302594 A1    Sep. 12, 2024

Related U.S. Application Data

(63) Continuation of application No. 17/625,691, filed as application No. PCT/US2020/041209 on Jul. 8, 2020, now Pat. No. 11,947,165.
(Continued)

(51) Int. Cl.
*G02B 6/255* (2006.01)
*G02B 6/44* (2006.01)

(52) U.S. Cl.
CPC ......... *G02B 6/2558* (2013.01); *G02B 6/4471* (2013.01)

(58) Field of Classification Search
CPC ............... G02B 6/2558; G02B 6/4471; G02B 6/44715; G02B 6/255
See application file for complete search history.

(56) References Cited

U.S. PATENT DOCUMENTS

| 5,528,718 A | 6/1996 | Ray et al. |
| 5,825,963 A | 10/1998 | Burgett |

(Continued)

FOREIGN PATENT DOCUMENTS

| WO | 2019027883 A1 | 2/2019 |
| WO | 2020061452 A1 | 3/2020 |
| WO | 2022011019 A1 | 1/2022 |

OTHER PUBLICATIONS

International Search Report and Written Opinion of the International Searching Authority for International Patent Application No. PCT/US2020/041209 mailed Oct. 22, 2020, 10 pages.

(Continued)

*Primary Examiner* — Jennifer Doan
(74) *Attorney, Agent, or Firm* — Merchant & Gould P.C.

(57) ABSTRACT

A multi-fiber cable assembly includes a pigtail segments spliced to a trunk segment using multiple mass fusion splices. The splices are disposed within an encapsulation at a common axial location. A flexible conduit extends from one end of the encapsulation to protect bare fibers of the trunk segment. A protective sheath extends from the opposite end of the encapsulation to protect the pigtail segments. The conduit and sheath are axially fixed to the encapsulation.

28 Claims, 40 Drawing Sheets

Related U.S. Application Data

(60) Provisional application No. 62/871,297, filed on Jul. 8, 2019, provisional application No. 62/986,179, filed on Mar. 6, 2020.

(56) References Cited

U.S. PATENT DOCUMENTS

| | | | |
|---|---|---|---|
| 6,152,609 | A | 11/2000 | Dzyck et al. |
| 7,756,372 | B2 | 7/2010 | Mullaney et al. |
| 8,041,166 | B2 | 10/2011 | Kachmar |
| 8,885,998 | B2 | 11/2014 | Marcouiller et al. |
| 9,500,830 | B2 | 11/2016 | Lu et al. |
| 11,947,165 | B2 * | 4/2024 | Petersen .............. G02B 6/4471 |
| 2006/0120672 | A1 | 6/2006 | Cody et al. |
| 2006/0269209 | A1 | 11/2006 | Mullaney et al. |
| 2008/0080818 | A1 | 4/2008 | Cobb et al. |
| 2011/0262084 | A1 | 10/2011 | Ott |
| 2011/0317975 | A1 | 12/2011 | Lu et al. |
| 2015/0000103 | A1 | 1/2015 | Mcavoy et al. |
| 2015/0253503 | A1 | 9/2015 | Saito et al. |
| 2016/0139355 | A1 * | 5/2016 | Petersen .............. G02B 6/4478 385/100 |
| 2018/0081126 | A1 | 3/2018 | Kowalczyk et al. |
| 2018/0235094 | A1 | 8/2018 | Takeuchi et al. |
| 2019/0154940 | A1 | 5/2019 | Kowalczyk et al. |
| 2021/0173146 | A1 * | 6/2021 | Wang ................... G02B 6/2553 |

OTHER PUBLICATIONS

Extended European Search Report for Application No. 20836709.4 mailed Jun. 23, 2023.

* cited by examiner

TERMINATING A CABLE ASSEMBLY WITH CONNECTORIZED PIGTAILS

CROSS-REFERENCE TO RELATED APPLICATIONS

This application is a continuation of U.S. patent application Ser. No. 17/625,691, filed on Jan. 7, 2022, now U.S. Pat. No. 11,947,165, which is a National Stage Application of PCT/US2020/041209, filed on Jul. 8, 2020, which claims the benefit of U.S. Patent Application Ser. No. 62/871,297, filed on Jul. 8, 2019, and claims the benefit of U.S. Patent Application Ser. No. 62/986,179, filed on Mar. 6, 2020, the disclosures of which are incorporated herein by reference in their entireties.

BACKGROUND

In fiber optic networks, there is a push to increase density by using higher fiber count cables in data centers and elsewhere. Cables having hundreds or even thousands of optical fibers each are being routed to equipment racks for connection. Ends of these cables are terminated at multiple multi-fiber connectors (e.g., MPO plug connectors). During termination, a cable jacket is removed to expose the optical fibers. Each optical fiber or small groups of fibers (e.g., fiber ribbons) may be manually threaded through furcation tubes. Then, the ends of the threaded fibers are connectorized, polished, and tested. Such a process is tedious, time-consuming, and labor intensive. Improvements are desired.

SUMMARY

Certain aspects of the disclosure are directed to cable assemblies in which one or more pigtail segments are spliced to a fiber optic cable (e.g., to a trunk segment of a fiber optic cable) using multiple mass fusion splices. The mass fusion splices are protected over a sufficiently short axial distance to allow coiling of the cable assembly. For example, the mass fusion splices can all be located at a common axial position along the cable.

The mass fusion splices are disposed within an encapsulation. In certain implementations, the mass fusion splices are embedded within the encapsulation. In some examples, the encapsulation includes a housing (e.g., a plastic housing) at least partially filled with epoxy or other fluid material. In other examples, the encapsulation includes an overmolded body.

In certain implementations, a flexible conduit (e.g., a corrugated tube) is fixedly coupled to one end of the encapsulation. In some examples, the conduit is mounted over the encapsulation. In other examples, the conduit is embedded within the encapsulation. At least bare fibers of the trunk segment are routed from a jacketed portion of the trunk segment to the splices. The bare fibers are sufficiently long to enable splicing of the trunk segment fibers at a mass fusion splice machine. The flexible conduit protects the bare fibers after splicing. The conduit is more flexible than the encapsulation.

In certain implementations, a protective sheath is fixedly coupled to the opposite end of the encapsulation. For example, the protective sheath may be embedded within the encapsulation. Portions of the pigtail segments are routed through the protective sheath to the splices. The bare fibers are sufficiently long to enable splicing of the pigtail segment fibers at a mass fusion splice machine. The protective sheath is more flexible than the encapsulation.

In certain implementations, the protective sheath includes a spiral wrap member disposed about a bundle of cables; and a securement member that holds an end of the spiral wrap member outside a circumferential boundary of the cable bundle. The bundle can include optical fibers, electrical connectors, and/or other media segments. In an example, the securement member holds the end of the spiral wrap at a fixed radial position relative to the bundle. In an example, the securement member holds the end of the spiral wrap at a fixed axial position relative to the bundle. In an example, the securement member holds the end of the spiral wrap at a fixed circumferential position relative to the bundle.

In some implementations, the securement member includes a conduit. In other implementations, the securement member includes a tie member. In certain implementations, a respective securement member can be utilized at opposite ends of the spiral wrap member to secure both ends.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
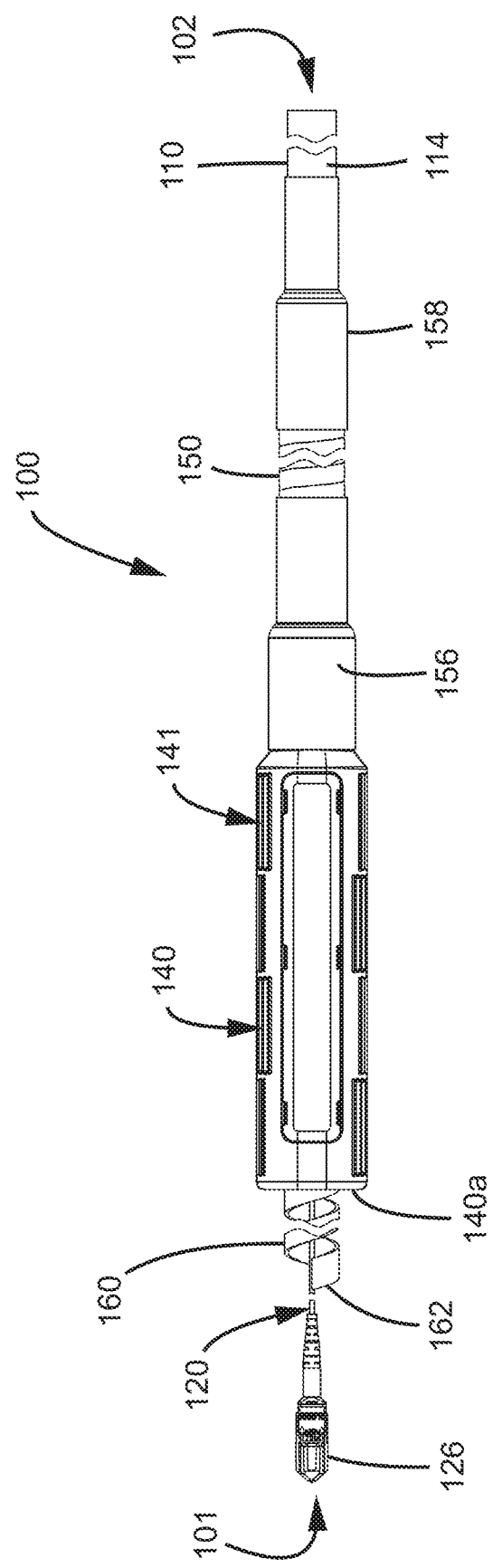
FIG. 1 is a side elevational view of a first example cable assembly including multiple mass fusion splices disposed within an encapsulation.

Reference will now be made in detail to exemplary aspects of the present disclosure that are illustrated in the accompanying drawings. Wherever possible, the same reference numbers will be used throughout the drawings to refer to the same or like parts.

Referring to FIGS. 1, 2, 14, 15, and 33-35, a multi-fiber cable assembly 100, 200, 400, 500 extends axially along a longitudinal axis L between a first end 101, 201, 401, 501 and a second end 102, 202, 402, 502. The cable assembly 100, 200, 400, 500 includes a trunk segment 110, 410, 510 and a plurality of pigtail segments 120, 420, 520. The trunk segment 110, 410, 510 includes a plurality of optical fibers 112, 412, 512 surrounded by a jacket 114, 414, 514. Each pigtail segment 120, 420, 520 includes a plurality of optical fibers 122, 422, 522 terminated at a common multi-fiber plug connector 126, 426, 526. The optical fibers 122, 422, 522 of each pigtail segment 120, 420, 520 are spliced to corresponding ones of the optical fibers 112, 412, 512 of the trunk segment 110, 410, 510 at respective mass fusion splices 130, 430, 530.

In some implementations, the pigtail segments 120, 420, 520 are coupled (e.g., spliced) to only one side of the trunk segment 110, 410, 510. In other implementations, the pigtail segments 120, 420, 520 are coupled (e.g., spliced) to opposite ends of the trunk segment 110, 410, 510 (e.g., see FIG. 33).

In some implementations, the pigtail segments 120, 420, 520 are spliced to the trunk segment 110, 410, 510 using a laminated mass fusion splice. Examples of laminated mass fusion splices are described in more detail in U.S. Provisional Appl. No. 62/836,294, filed Apr. 19, 2019, and titled "Flexible Splice," the disclosure of which is hereby incorporated herein by reference in its entirety. In other implementations, the pigtail segments 120, 420, 520 are spliced to the trunk segment 110, 410, 510 using other types of mass fusion splices.

The mass fusion splices 130, 430, 530 are disposed within an encapsulation 140, 440, 540. The encapsulation 140, 440, 540 can be referred to as a fanout housing. The encapsulation 140, 440, 540 extends between a first axial end 140a, 440a, 540a and a second axial end 140b, 440b, 540b. In an example, the encapsulation 140, 440, 540 is elongate between the first and second axial ends 140a, 140b, 440a, 440b, 540a, 540b. In certain implementations, the splices 130, 430, 530 are held at a fixed position within the encapsulation 140, 440, 540. In some implementations, the encapsulation 140, 440, 540 includes a hollow body filled with epoxy or other material M (e.g., see FIGS. 1-13). In other implementations, the encapsulation 140 includes an overmolded body fully surrounding the splices 130 (e.g., see FIGS. 14-18). In still other implementations, the splices are disposed within a hollow cavity within the encapsulation 140, 440, 540. The encapsulation 140, 440, 540 is designed to be assembled around the splices 130, 430, 530 as will be described in more detail herein.

A conduit 150, 450 extends between a jacketed portion of the trunk segment 110, 410, 510 and the second axial end 140b, 440b, 540b of the encapsulation 140, 440, 540. The trunk segment fibers 112, 412, 512 are routed through the conduit 150, 450. In certain examples, the conduit 150, 450 includes a corrugated tube. The conduit 150, 450 is more flexible than the encapsulation 140, 540, thereby allowing the cable assembly 100, 200, 400, 500 to be wound on a spool or mandrel. In certain implementations, the conduit 150, 450 extends between a first end 152, 452 that couples to the encapsulation 140, 440, 540 and a second end 154 that couples to the jacketed portion of the trunk segment 110, 410, 510. The conduit 150, 450 is sized to hold all of the optical fibers 112, 412, 512 of the trunk segment 110, 410, 510. In certain implementations, the conduit 150, 450 defines an axial slit extending between the first and second ends 152, 154 to facilitate laterally mounting the conduit 150, 450, 550 over the trunk segment fibers 112, 412, 512.

A protective sheath 160, 460, 560 extends from the first axial end 140a, 440a, 540a of the encapsulation 140, 440, 540 towards the multi-fiber connectors 126, 426, 526. The protective sheath 160, 460, 560 is axially fixed to the encapsulation 140, 440, 540. In certain implementations, the sheath 160, 460, 560 is embedded within the encapsulation 140, 440, 540. In some implementations, the sheath 160, 460 is sized to hold all of the optical fibers 122, 422 of the pigtail segments 120, 420. In other implementations, each sheath 560 is sized to hold the optical fibers 522 of a subset of the pigtail segments 520. Accordingly, a cable assembly 500 can include multiple protection sheaths 560 extending from the first axial end 540a of the encapsulation 540 (e.g., see FIG. 39). In certain implementations, each protection sheath 560 can be routed to a different chassis or section of a chassis of a communications panel (e.g., a termination panel, a splice panel, etc.).

Each sheath 160, 460, 560 is more flexible than the encapsulation 140, 44, 540 thereby allowing the cable assembly 100, 200, 400, 500 to be wound on a spool or mandrel. In some implementations, the sheath 160, 460, 560 provides bend radius protection to the optical fibers 122, 422, 522 held therein. In other implementations, the sheath 160, 460, 560 holds the respective fibers 122, 422, 522 together in a group for manipulation as a unit. In some implementations, the sheath 160, 460, 560 includes a spiral wrap sheath (see FIGS. 3, 35, and 40) that can be wrapped around some or all of the pigtail segments 120, 420, 520 after the pigtail segments 120, 420, 520 are spliced to the trunk segment 110, 410, 510. In other implementations, the sheath 160, 460, 560 includes a mesh sleeve defining an axial slit through which some or all of the pigtail segments 120, 420, 520 can be inserted into the mesh sleeve 160, 460, 560 after being spliced to the trunk segment 110, 410, 510.

The cable assembly 100, 200, 400, 500 is coilable about a spool or mandrel. In certain implementations, the encapsulation 140, 440, 540 has a transverse cross-dimension that defines the maximum transverse cross-dimension of the cable assembly 100, 200, 400, 500. In some implementations, the encapsulation 140, 440, 540 has a maximum transverse cross-dimension of no more than 4 inches. In certain implementations, the encapsulation 140, 440, 540 has a maximum transverse cross-dimension of no more than 3 inches. In certain implementations, the encapsulation 140, 440, 540 has a maximum transverse cross-dimension of no more than 2 inches.

The cable assembly 100, 200, 400, 500 includes at least twenty-four trunk segment fibers 112, 412, 512. In certain implementations, the cable assembly 100, 200, 400, 500 includes at least seventy-two trunk segment fibers 112, 412, 512. In certain implementations, the cable assembly 100, 200, 400, 500 includes at least one hundred forty-four trunk segment fibers 112, 412, 512. In certain implementations, the cable assembly 100, 200, 400, 500 includes at least two hundred eighty-eight trunk segment fibers 112, 412, 512. In certain implementations, the cable assembly 100, 200, 400, 500 includes at least 576 trunk segment fibers 112, 412, 512. In certain implementations, the cable assembly 100, 200, 400, 500 includes at least 864 trunk segment fibers 112, 412, 512. In certain implementations, the cable assembly 100, 200, 400, 500 includes at least 1,728 trunk segment fibers 112, 412, 512. In certain implementations, the cable assembly 100, 200, 400, 500 includes at least 3,456 trunk segment fibers 112, 412, 512. In certain implementations, the cable assembly 100, 200, 400, 500 includes at least 6,912 trunk segment fibers 112, 412, 512.

For case in viewing, only a single pigtail segment 120 is shown in FIGS. 1-32. It will be understood, however, that the cable assembly 100, 200, 400, 500 includes at least two pigtail segments 120, 420, 520. In certain implementations, the cable assembly 100, 200, 400, 500 includes at least six pigtail segments 120, 420, 520. In certain implementations, the cable assembly 100, 200, 400, 500 includes at least twelve pigtail segments 120, 420, 520. In certain implementations, the cable assembly 100, 200, 400, 500 includes at least twenty-four pigtail segments 120, 420, 520. In certain implementations, the cable assembly 100, 200, 400, 500 includes at least forty-eight pigtail segments 120, 420, 520. In certain implementations, the cable assembly 100, 200, 400, 500 includes at least seventy-two pigtail segments 120, 420, 520. In certain implementations, the cable assembly 100, 200, 400, 500 includes at least 144 pigtail segments 120, 420, 520. In certain implementations, the cable assembly 100, 200, 400, 500 includes at least 288 pigtail segments 120, 420, 520.

Figure 39:
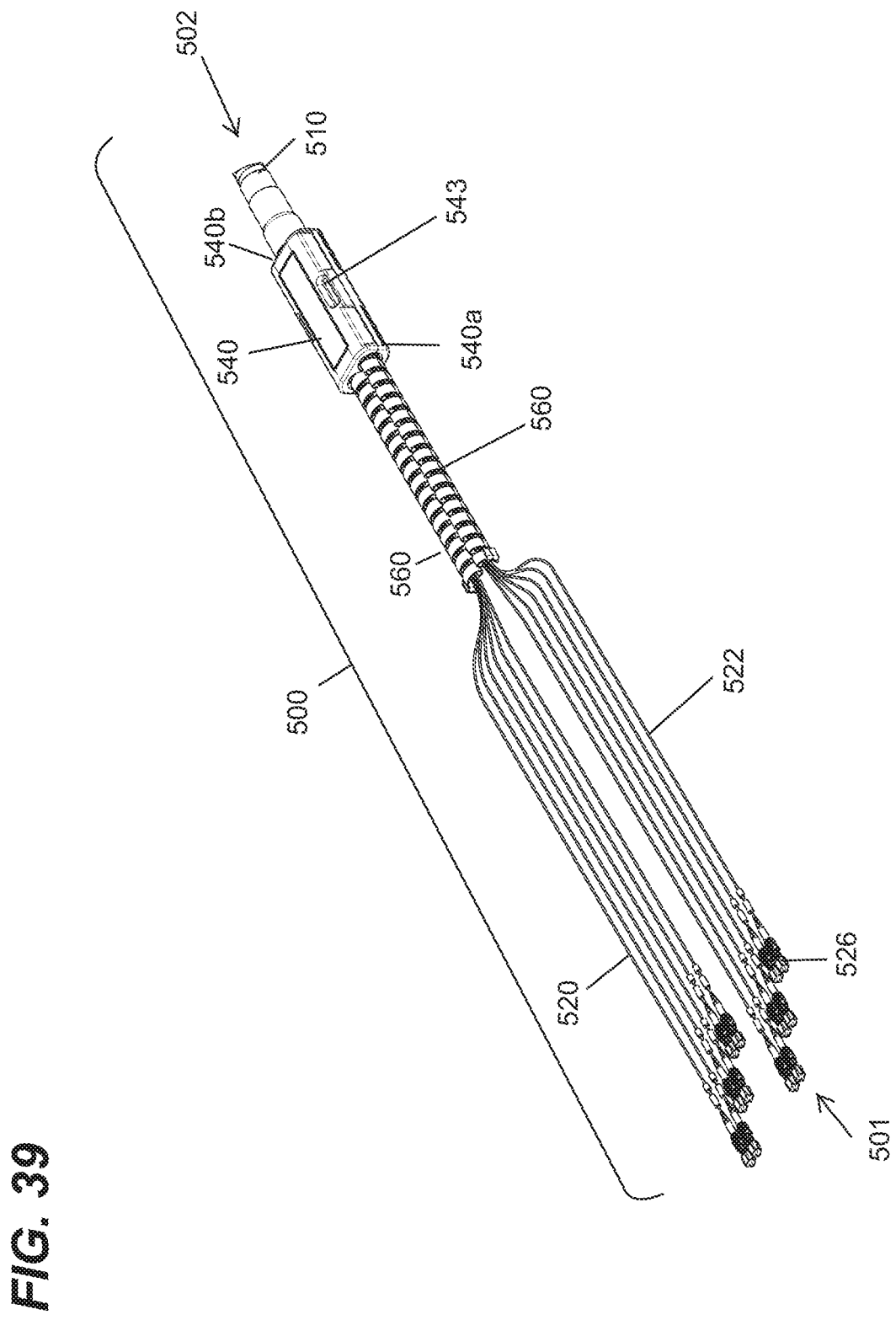
FIG. 39 is a perspective view of one end of another example cable assembly including multiple groups of pigtail segments spliced to a trunk segment, the cable assembly also including a fanout housing or encapsulation protecting the optical splices.
Figure 40:
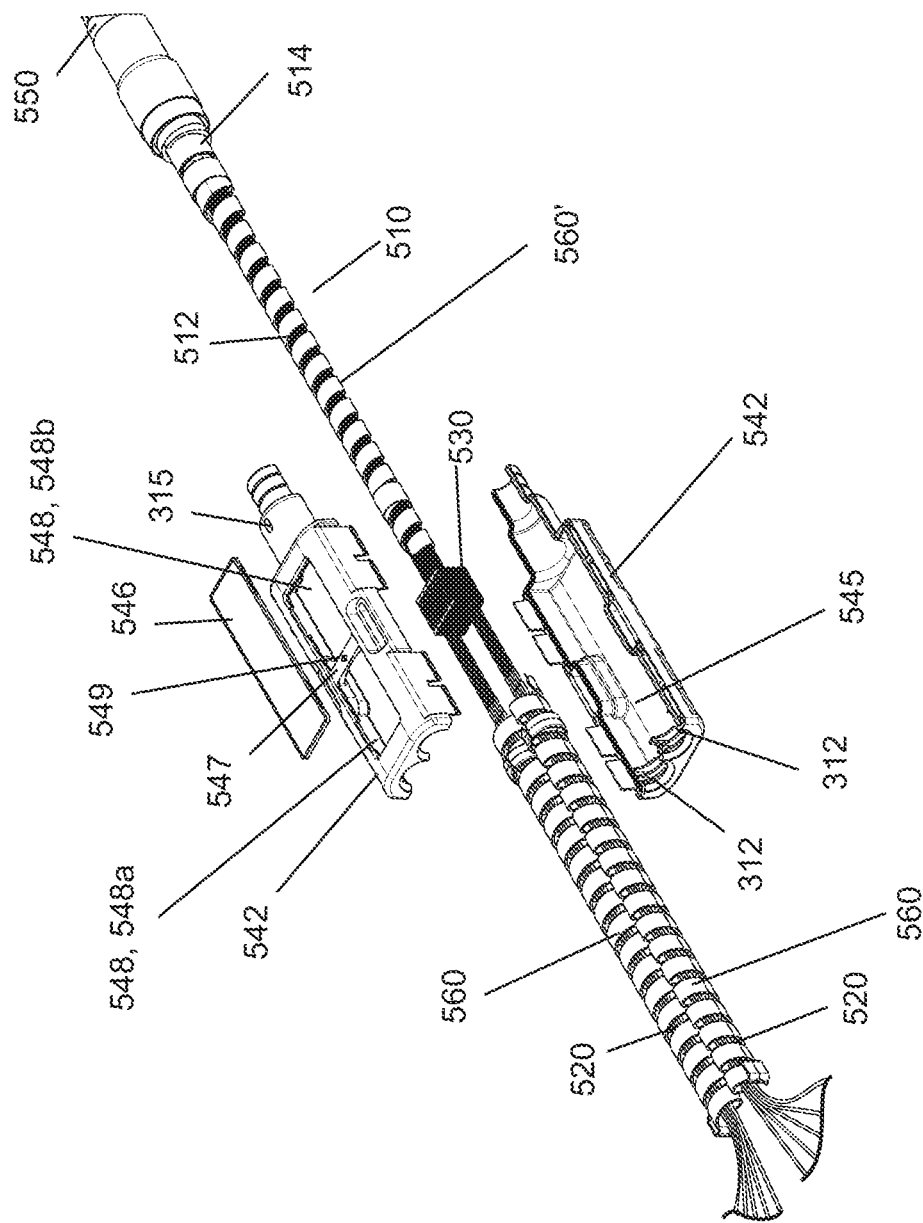
FIG. 40 is a perspective view of the cable assembly of FIG. 39 shown with components exploded from each other for ease in viewing.

FIGS. 1-13 illustrate the components of a first example cable assembly 100. FIGS. 14-18 illustrate the components of a second example cable assembly 200. FIGS. 33-38 illustrate the components of a third example cable assembly 400. FIGS. 39-40 illustrate the components of a fourth example cable assembly 500.

In the first example cable assembly 100, the encapsulation 140 includes a housing arrangement 141 defining a cavity 145 in which the mass fusion splices 130 can be disposed. In certain examples, the cavity 145 can then be filled with a fluid material M (e.g., epoxy or other adhesive, molding material, etc.) that solidifies within the cavity 145. The housing arrangement 141 includes at least a first housing piece 142 and a second housing piece 144 that cooperate to define the cavity 145. Because the housing arrangement 141 is formed from at least two pieces, the housing arrangement 141 can be easily assembled around the mass fusion splices 130.

In certain implementations, the housing arrangement 141 also includes a third piece 146. For example, the second housing piece 144 may define an aperture 148 providing access to the cavity 145 from an exterior of the housing arrangement 141. The material M may be inserted into the cavity 145 through the aperture 148. The third housing piece 146 may couple to the second housing piece 144 to close the aperture 148. In certain implementations, the third housing piece 146 latches or otherwise secures to the second housing piece 144. In certain implementations, the third housing piece 146 is installed before or while the fluid material (e.g., epoxy) M is solidifying (e.g., curing). In such implementations, the material can hold the third housing piece 146 to the second housing piece 144.

Figure 4:
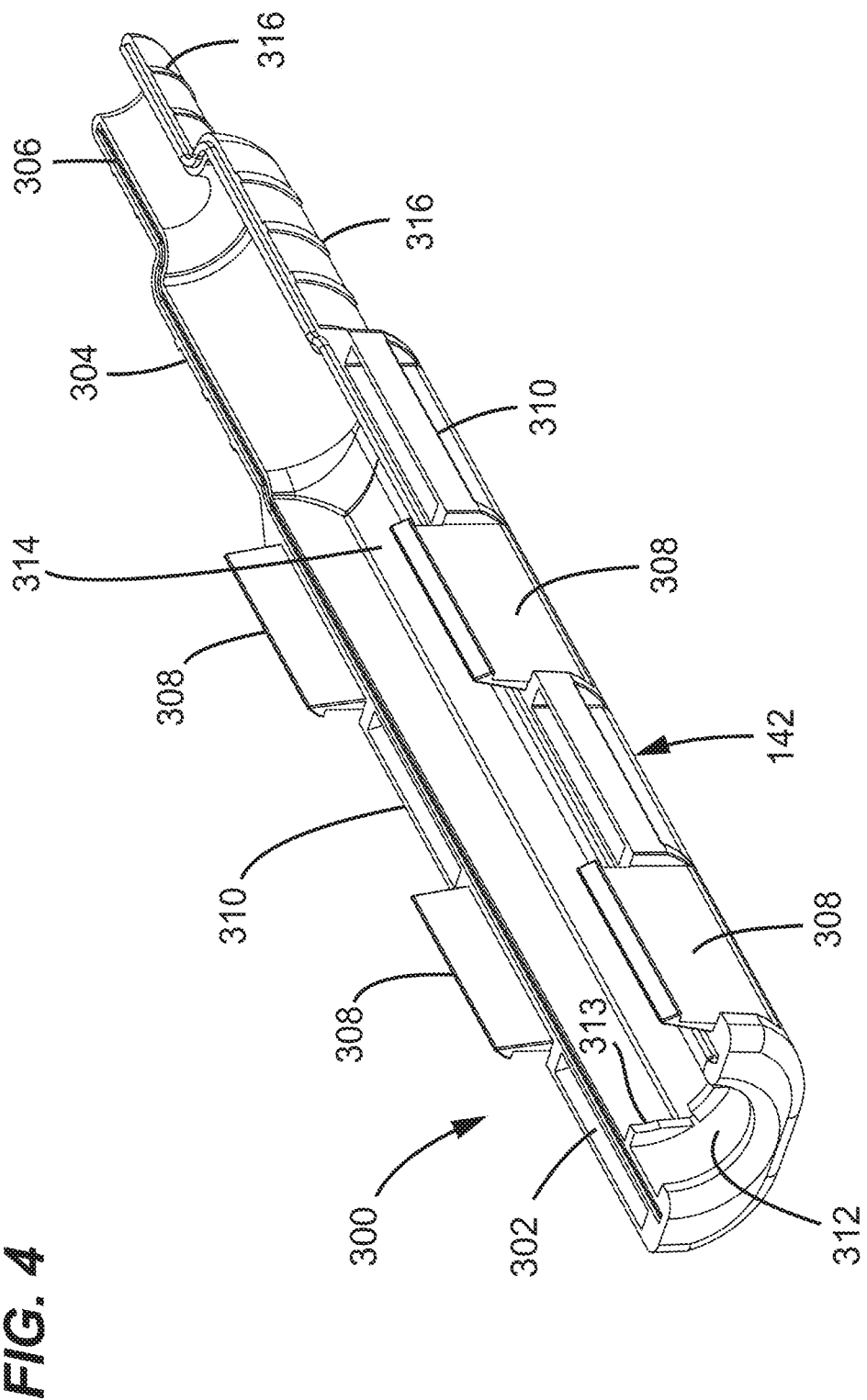
FIG. 4 is a perspective view of an example first housing piece of a housing arrangement of the first cable assembly of FIG. 1.
Figure 5:
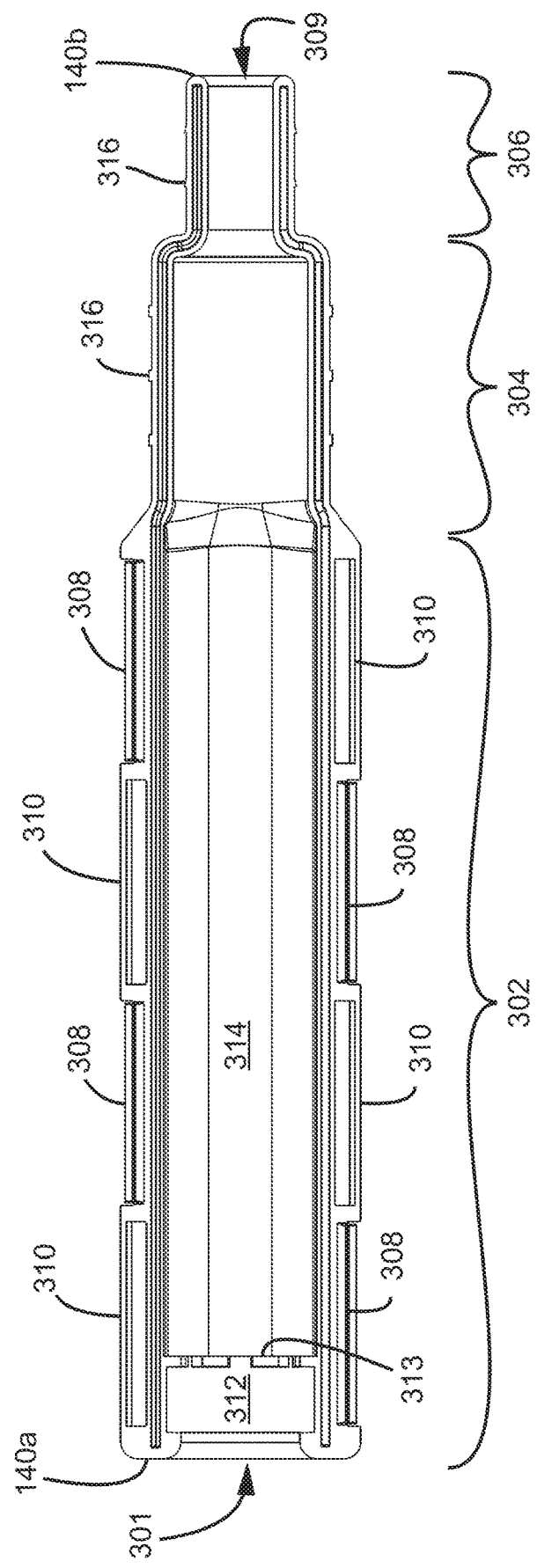
FIG. 5 is an interior plan view of the first housing piece of FIG. 4.
Figure 6:
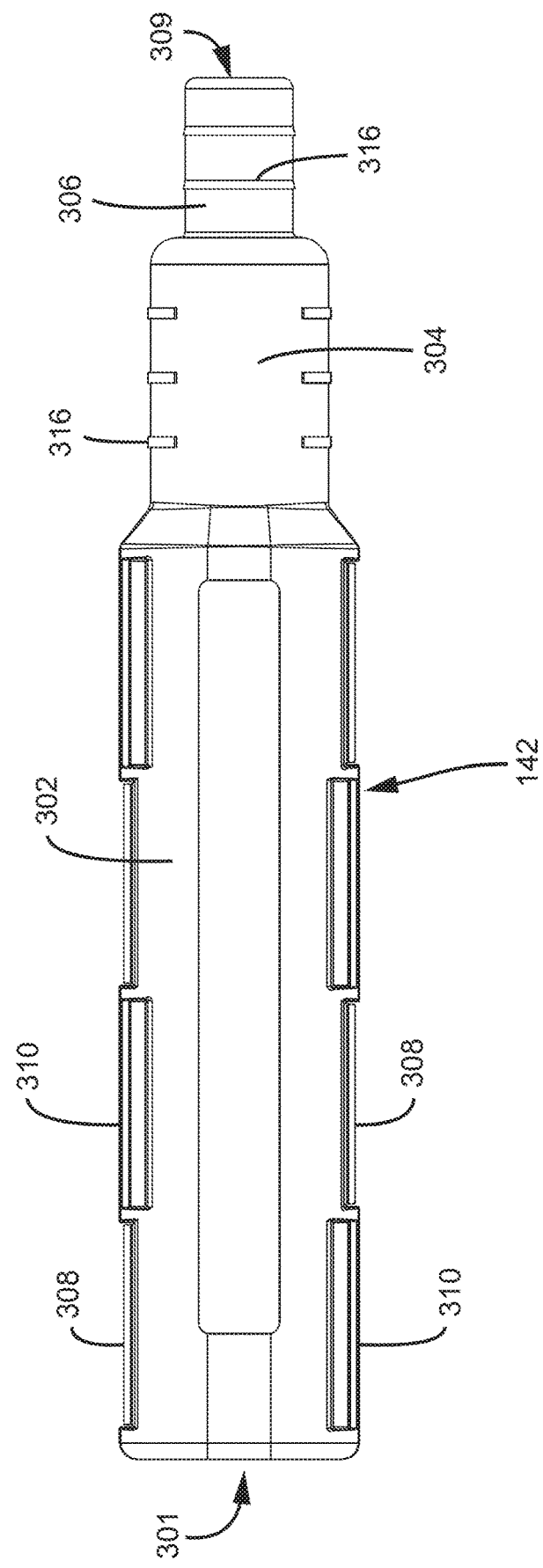
FIG. 6 is an exterior plan view of the first housing piece of FIG. 4.
Figure 7:
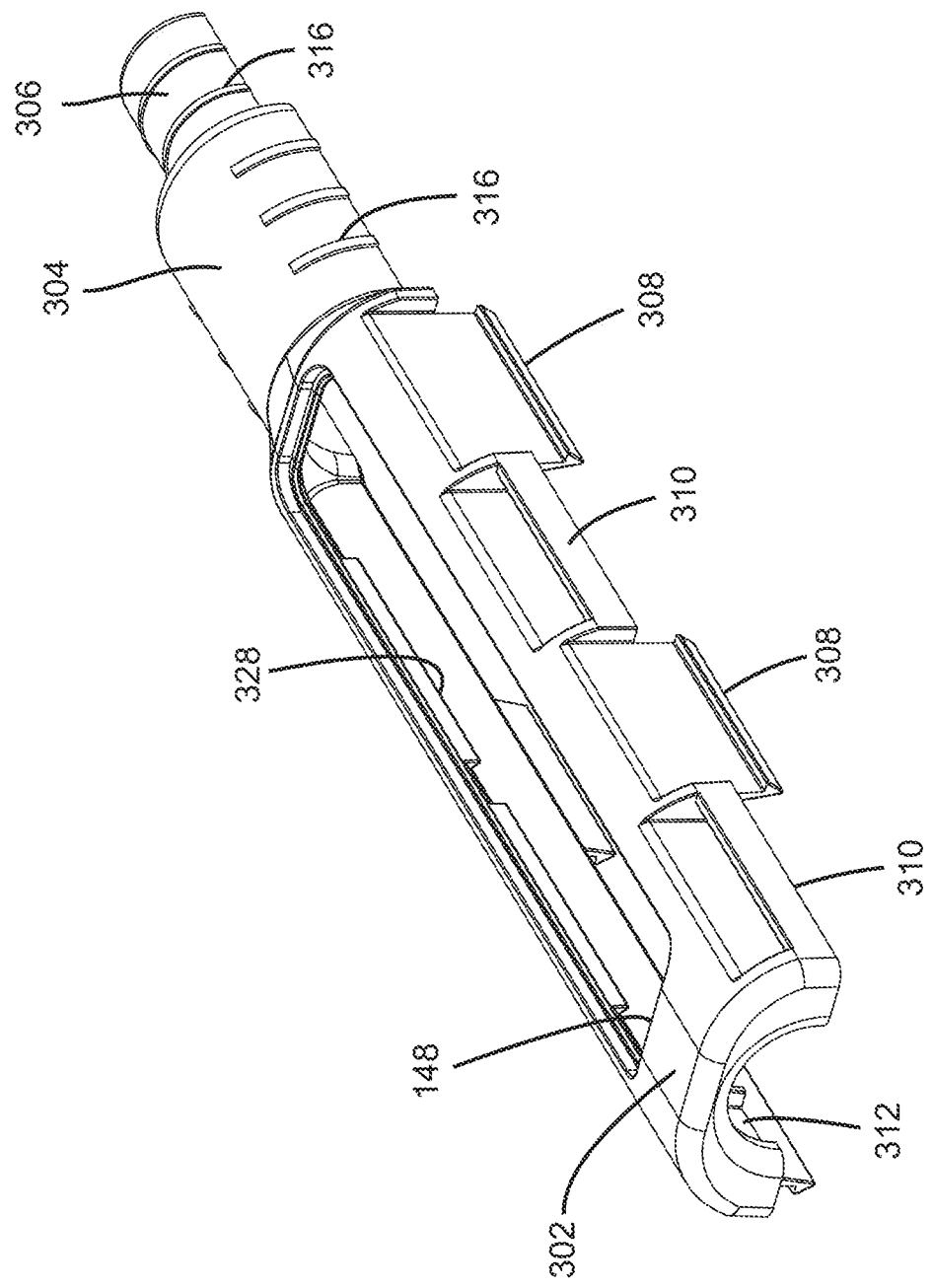
FIG. 7 is a perspective view of an example second housing piece of the housing arrangement of the first cable assembly of FIG. 1.
Figure 8:
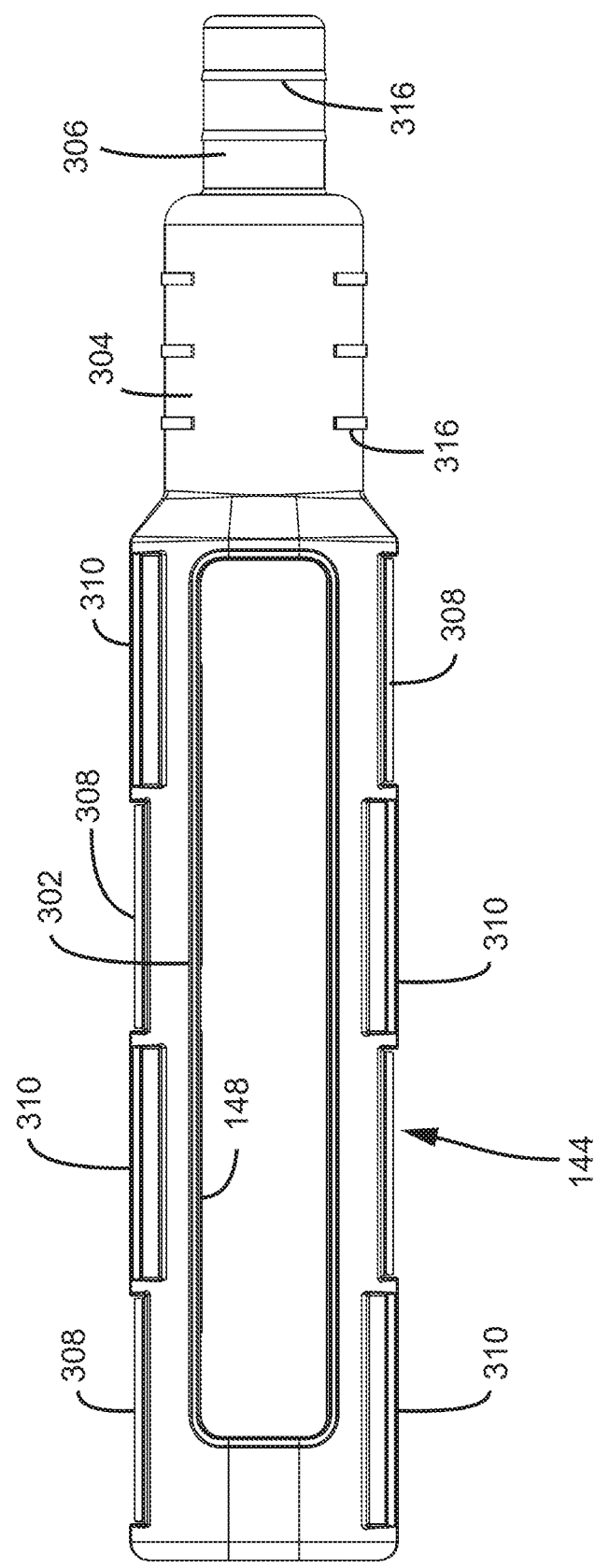
FIG. 8 is an exterior plan view of the second housing piece of FIG. 7.
Figure 9:
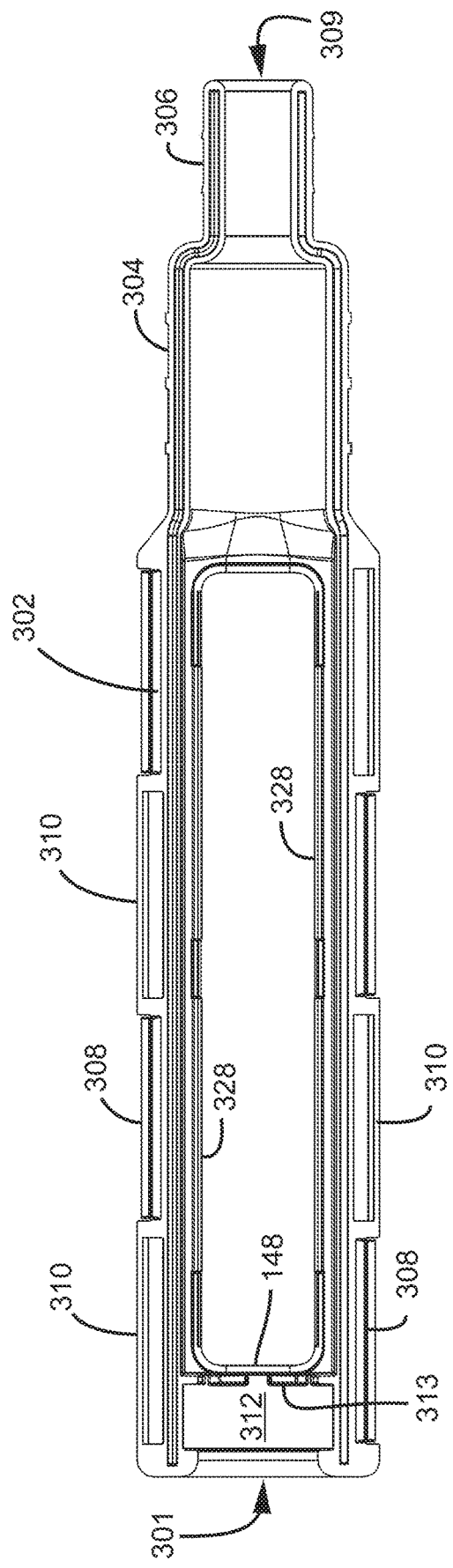
FIG. 9 is an interior plan view of the second housing piece of FIG. 7.

FIGS. 4-6 illustrate an example first housing piece 142 and FIGS. 7-9 illustrate an example second housing piece 144. In certain implementations, the first and second housing pieces 142, 144 are substantially identical except that the second housing piece 144 also defines the aperture 148. Each housing piece 142, 144 has a body 300 extending between a first end 301 and a second end 309. The bodies 300 include an attachment arrangement to hold the bodies 300 together. In certain examples, at least one of the bodies 300 includes latches 308 and at least the other of the bodies 300 includes catches 310 configured to receive the latches 308. In the example shown, both bodies 300 include both latches 308 and catches 310.

Each body 300 defines a first region 302, a second region 304, and a third region 306. The first, second, and third regions 302, 304, 306 cooperate to define a respective channel extending axially through the body 300. The channels at the first regions 302 cooperate to define the cavity 145 in which the splices 130 may be disposed. The first regions 302 also cooperate to define a pocket 312 at the first end 301 of the cavity 145. A wall structure 313 at least partially separates the pocket 312 from the remainder of the cavity 145. The second region 304 has a smaller transverse cross-dimension than the first region 302. The third region 306 has a smaller transverse cross-dimension than the second region 304. The exterior of the second and/or third regions 304, 306 may include ridges 316 or other texturing.

Figure 10:
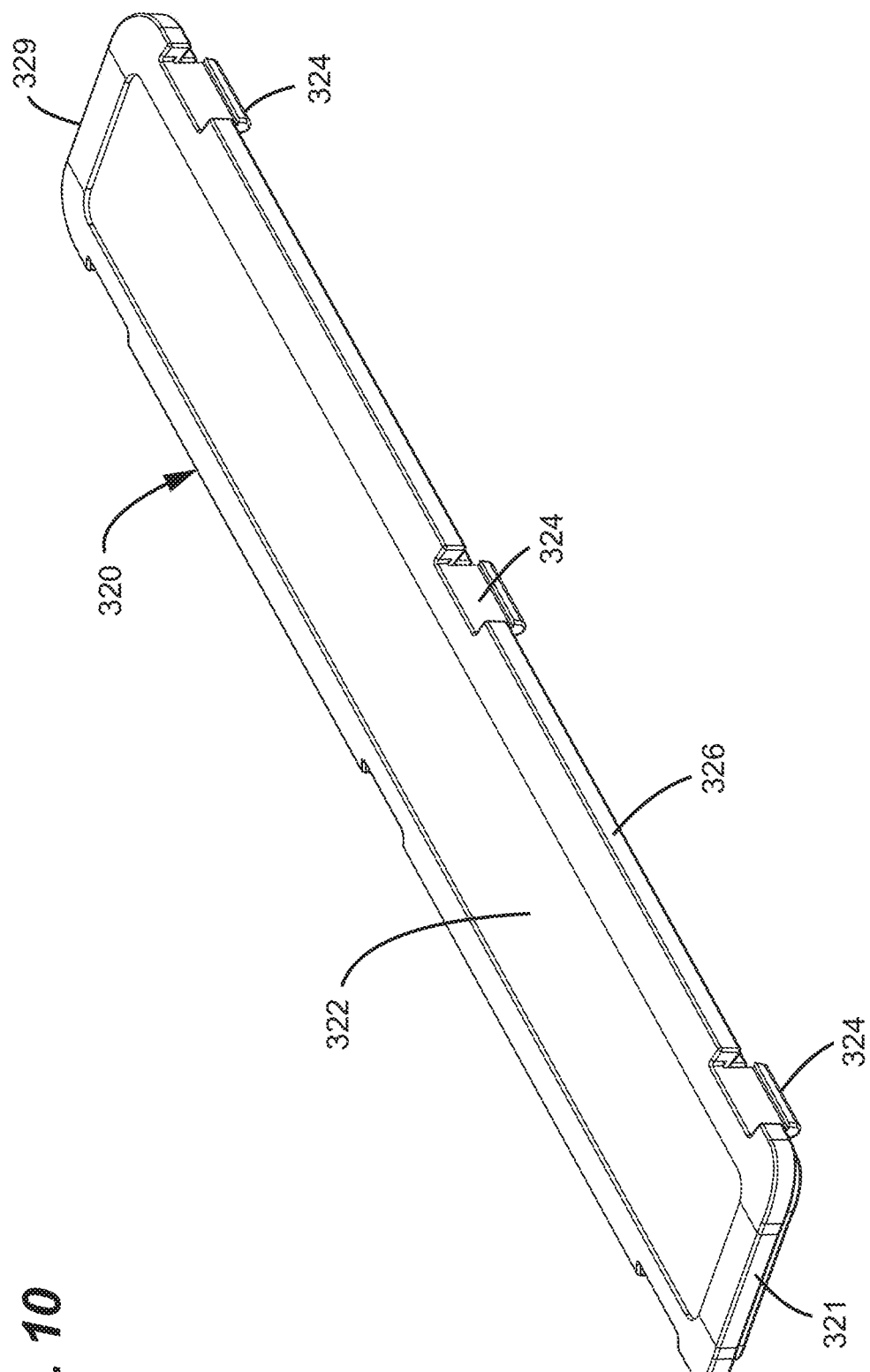
FIG. 10 is a perspective view of an example third housing piece of the housing arrangement of the first cable assembly of FIG. 1.
Figure 11:
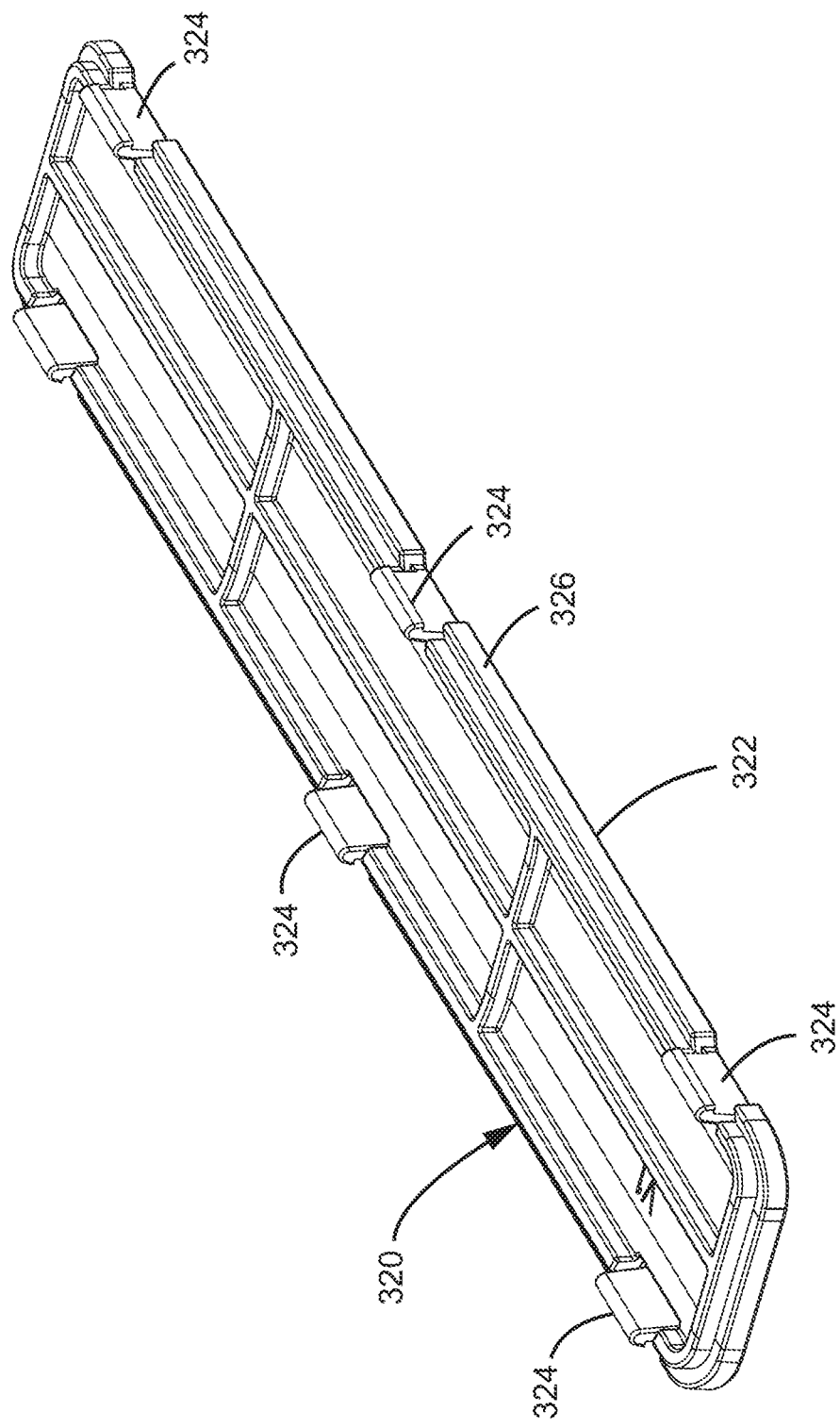
FIG. 11 is another perspective view of the third housing piece of FIG. 10.

FIGS. 10 and 11 illustrate an example third housing piece 146 configured to couple to the second housing piece 144. The third housing piece 146 includes a body 320 extending between a first end 321 and a second end 329. The body 320 defines a closing surface 322 defining a periphery 326. In certain implementations, the closing surface 322 is sized so that the periphery 326 fits within the aperture 148 of the second housing piece 144. Accordingly, the third housing piece 146 may fit within a profile defined by the first and second housing pieces 142, 144.

In certain implementations, an attachment structure couples the third housing piece 146 to the second housing piece 144. In certain examples, the attachment structure includes latches 324 and catches 328 (FIG. 7). In the example shown, the latches 324 are provided by the third housing piece 146 and the catches 328 are provided by the second housing piece 144. In other examples, however, both housing pieces 144, 146 can include latches 324 and catches 328. In the example shown, the latches 324 are recessed inwardly from the periphery 326 to permit the closing surface 322 to extend across the aperture 148 of the second housing piece 144.

Figure 2:
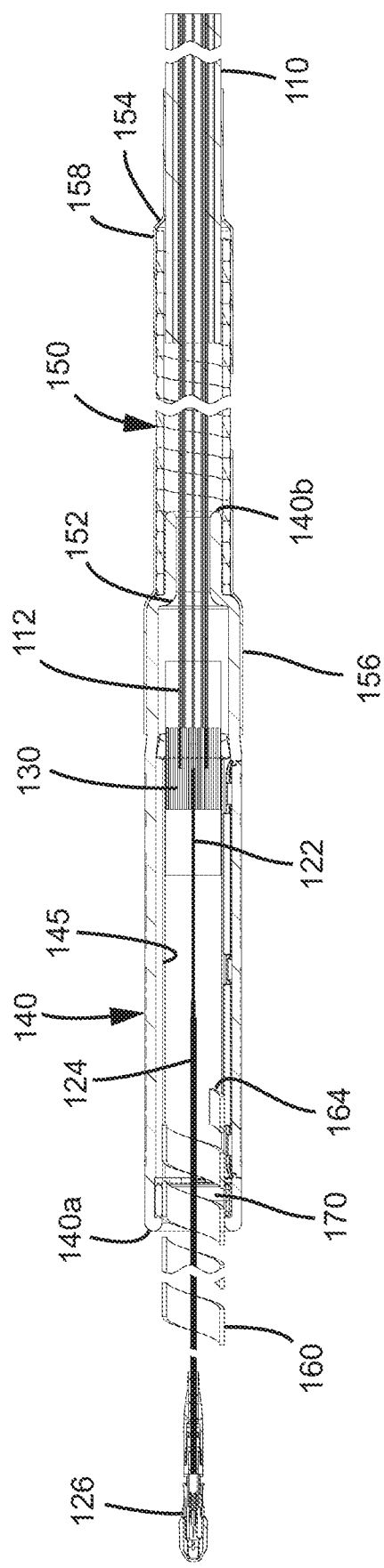
FIG. 2 is a longitudinal cross-sectional view of the first cable assembly of FIG. 1.
Figure 3:
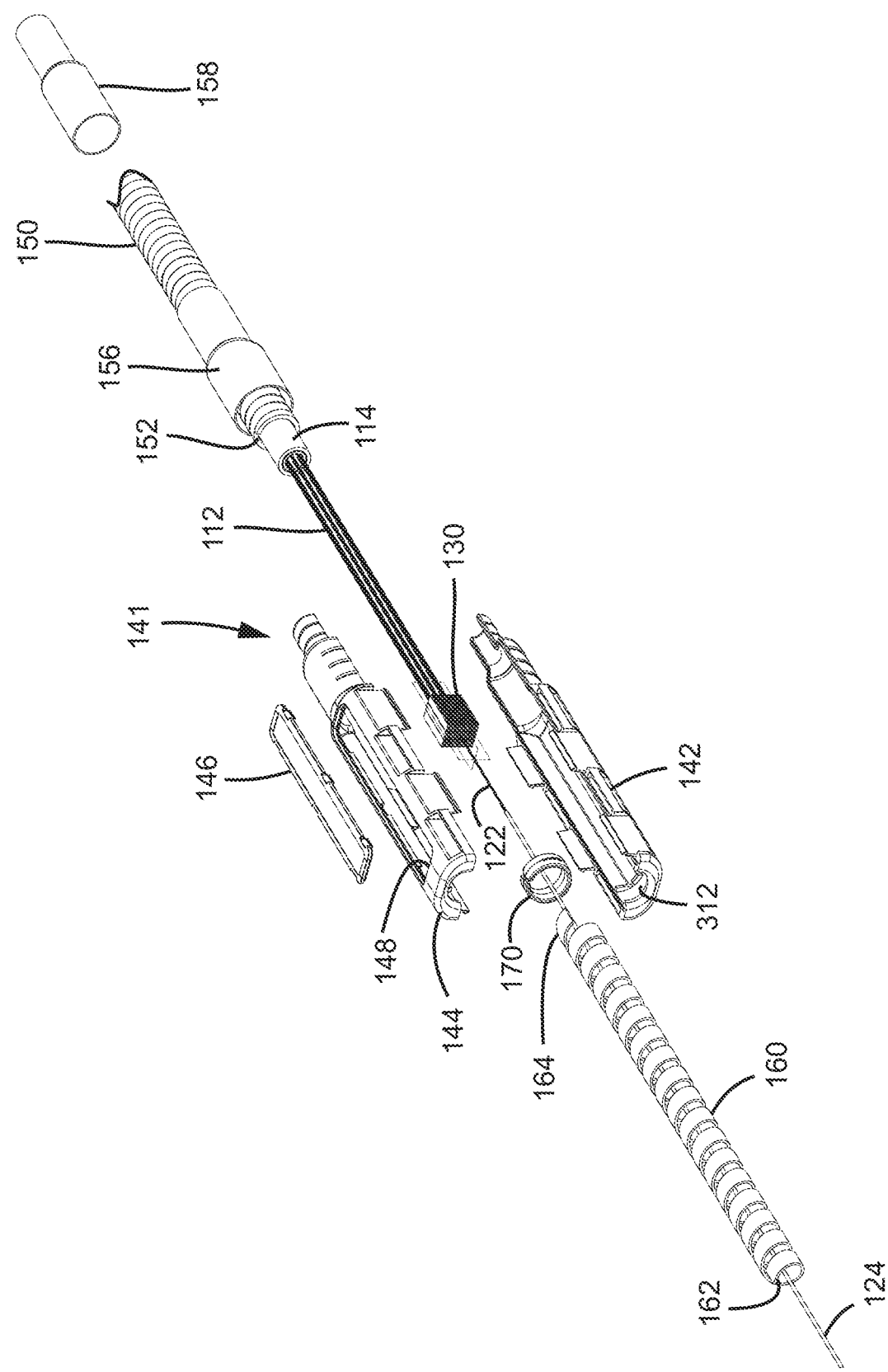
FIG. 3 is a perspective view of the first cable assembly of FIG. 1 with the components exploded from each other for ease in viewing.

As shown in FIGS. 2 and 3, in certain implementations, the trunk segment 110 is coupled to the housing arrangement 141 directly or through the conduit 150. For example, the fibers 112 of the trunk segment 110 extend from the splices 130, through part of the cavity 145 of the housing arrangement 141, and out of the second axial end 140b of the housing arrangement 141. Accordingly, at least a portion of the fibers 112 are disposed within the solidified material M within the housing arrangement 141. In some implementations, strength members of the trunk segment 110 secure to the housing arrangement 141. In other implementations, strength members of the trunk segment 110 secure to the conduit 150. For example, strength members of the trunk segment 110 can be routed through the conduit 150 with the fibers 112 and into the housing arrangement 141 to be encapsulated in the solidified material M with the fibers 112 and splices 130.

The conduit 150 is coupled to the third region 306 of the housing arrangement 141. For example, the third region 306 of the housing arrangement 141 may be inserted into the conduit 150 (e.g., see FIG. 2). Ribs 316 at the third region 306 may aid in holding the conduit 150 to the housing arrangement 141. In certain implementations, the conduit 150 may be further secured to the housing arrangement 141 using a retention sleeve (e.g., a heat-shrink tube) 156. The retention sleeve 156 extends over the second region 304 of the housing arrangement 141 and over a portion of the conduit 150 at the first end 152 of the conduit 150.

The retention sleeve 156 is threaded onto the trunk segment 110 before splicing the pigtail segments 120 to the trunk segment 110. In certain examples, the retention sleeve 156 carries adhesive at an inner surface to bond to the housing arrangement 141 and/or conduit 150. In certain examples, the retention sleeve 156 shrinks against the housing arrangement 141 and/or conduit 150 (e.g., the sleeve 156 is thermally responsive, the sleeve 156 is resilient, etc.). In certain implementations, the second region 304 of the housing arrangement 141 defines ribs 316 or other texturing to aid in holding the retention sleeve 156 at the second region 304.

In certain implementations, a second retention sleeve 158 may secure the second end 154 of the conduit 150 to the trunk segment 110. The retention sleeve 158 is threaded onto the trunk segment 110 before splicing the pigtail segments 120 to the trunk segment 110. The retention sleeve 158 extends over the second end 154 of the conduit 150 and over a portion (e.g., a jacketed portion) of the trunk segment 110. In certain examples, the retention sleeve 158 carries adhesive at an inner surface to bond to the conduit 150 and/or trunk segment 110. In certain examples, the retention sleeve 158 shrinks against the conduit 150 and/or trunk segment 110 (e.g., the sleeve 158 is thermally responsive, the sleeve 158 is resilient, etc.). In certain implementations, the conduit 150 spaces the retention sleeves 156, 158 from each other.

In some implementations, strength members of the trunk segment 110 are secured to the second end 154 of the conduit 150. In other implementations, strength members of the trunk segment 110 are secured to the first end 152 of the conduit 150. In other implementations, strength members of the trunk segment 110 are secured to the housing arrangement 141. For example, the strength members may be routed through the conduit 150 and sandwiched between the third region 306 of the housing arrangement 141 and the first end 152 of the conduit 150.

In certain implementations, the fibers 112 of the trunk segment 110 have a combined transverse cross-sectional area sufficient to inhibit fluid material M injected into the cavity 145 from flowing into the conduit 150. For example, the fibers 112 function as a plug for the fluid material M. In certain implementations, the fibers 112 plug the material M from flowing into the third region 306 of the housing arrangement 141. In certain implementations, the fibers 112 plug the material M from flowing into the second region 304 of the housing arrangement 141. In certain implementations, tape can be wrapped around the fibers 112 at the second region 304 and/or at the third region 306 to help plug the material M. In certain implementations, strength members of the trunk segment 110 can be routed through the conduit 150 with the fibers 112 and into the housing arrangement 141 to be encapsulated in the material M with the fibers 112 and splices 130.

Still referring to FIGS. 2 and 3, the pigtail segments 120 are secured to the encapsulation 140 using the material M. For example, the pigtail segments 120 extend from the splices 130, through part of the cavity 145 of the housing arrangement 141, and out of the first axial end 140a of the housing arrangement 141. The protective sheath 160 disposed around the pigtail segments 120 also extends into the housing arrangement 141 through the first end 140a. In certain implementations, a ring clip 170 or other plug is disposed within the housing arrangement 141 at the first end 140a to inhibit material M from exiting the housing arrangement 141 at the first end 140a. For example, the ring clip 170 may seat within the pocket 312 (see FIG. 2).

Figure 12:
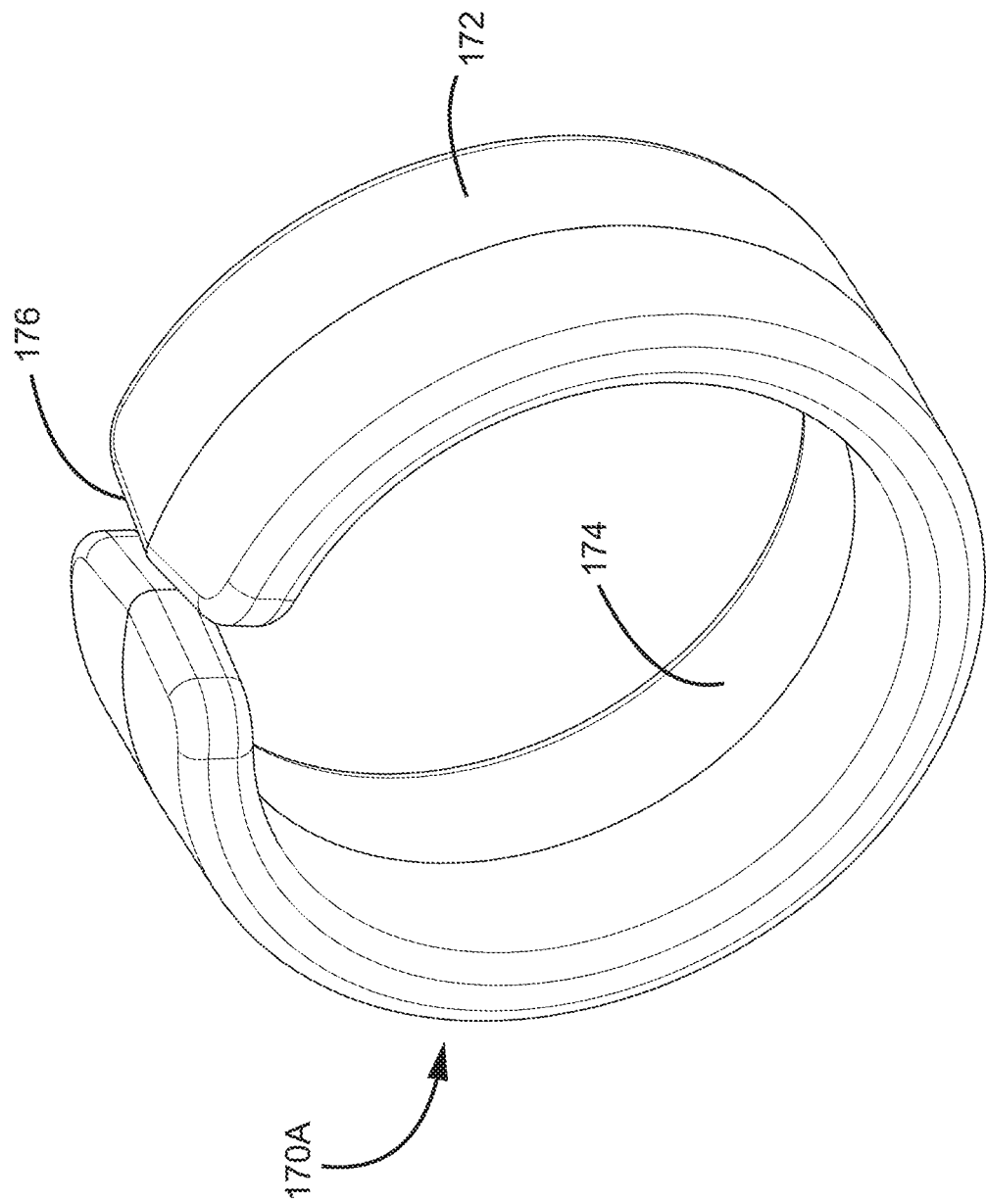
FIG. 12 is a perspective view of a first example ring clip suitable for use with the first cable assembly of FIG. 1.
Figure 13:
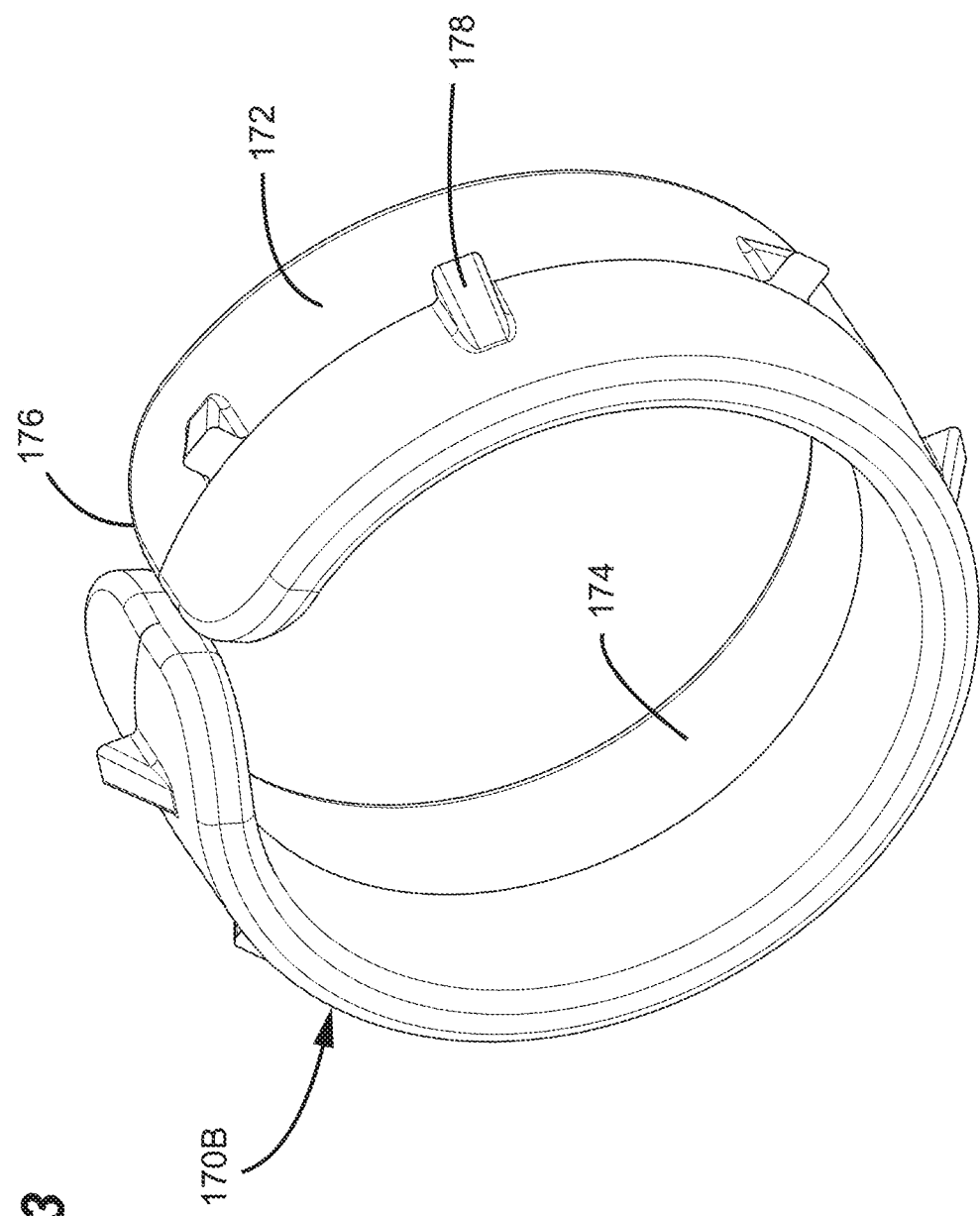
FIG. 13 is a perspective view of a second example ring clip suitable for use with the first cable assembly of FIG. 1.

FIGS. 12 and 13 illustrate example ring clips 170A, 170B. Each ring clip 170A, 170B includes a body 172 defining a through-passage 174. The body 172 also defines an axial slit 176 providing radial access to the through-passage 174 from an exterior of the body 172. The body 172 is sufficiently resilient to enable flexing of the body 172 to open or widen the slit 176. Accordingly, the pigtail segments 120 can be laterally loaded into the ring clip 170A, 170B via the slit 176. Laterally loading the pigtail segments 120 allows the ring clip 170A, 170B to hold more pigtail segments 120 than it otherwise would had the connectorized ends 126 of the pigtail segments needed to be threaded through the through-passage 174.

The ring clip 170A shown in FIG. 12 is suitable for use with a spiral wrap sheath 160 as shown in FIG. 3. Pigtail segments 120 are loaded into the ring clip 170A and the ring clip 170A is disposed in the pocket 312 within the housing cavity 145. The pocket 312 axially retains the ring clip 170A at the first end 140a of the housing arrangement 141. The ring clip 170A is sized to fit around the spiral wrap sheath 160 (see FIG. 2). In certain implementations, the ring clip 170A plugs the first end 140a of the housing arrangement 141 to inhibit fluid material M from leaking or otherwise exiting the housing cavity 145 through the first end 140a. For case in viewing, FIG. 2 shows only one pigtail segment 120 extending through the sheath 160. In use, a plurality of pigtail segments 120 would extend through the sheath 160 sufficient to block flow of the material M out of the housing 141 through the sheath 160.

The ring clip 170B shown in FIG. 13 is suitable for use with a mesh sleeve type sheath 160. The mesh sleeve and the ring clip 170B both define respective axial slits through which the pigtail segments 120 are loaded. In certain implementations, the ring clip 170B also includes teeth 178 or other catch features to engage the mesh sleeve (e.g., to protrude through holes defined by the mesh). In some examples, the teeth 178 are disposed at an exterior of the body 172 and the ring clip 170B is mounted inside of the mesh sleeve 160. Accordingly, when the ring clip 170B is disposed in the pocket 312, the mesh sleeve is radially sandwiched between the ring clip 170B and the housing arrangement 141. In certain examples, the ring clip 170B axially holds the mesh sleeve 160 at the first end 140a of the housing arrangement 141. In certain examples, the ring clip 170B plugs the first end 140a against flow of material M out of the housing cavity 145.

Figure 14:
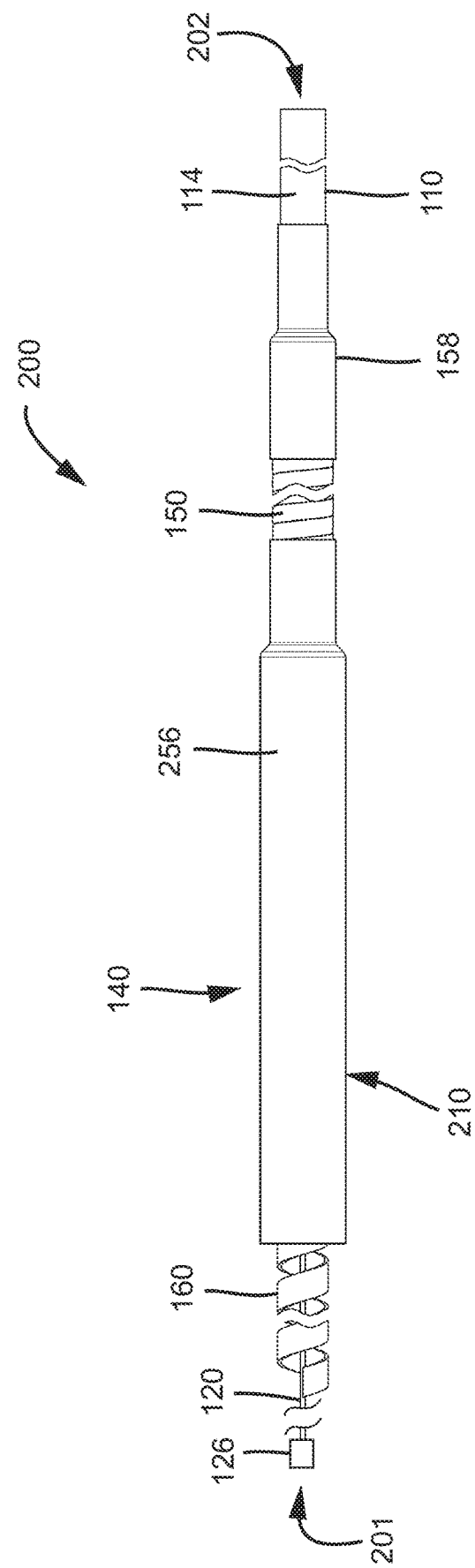
FIG. 14 is a side elevational view of a second example cable assembly including multiple mass fusion splices disposed within an encapsulation.
Figure 15:
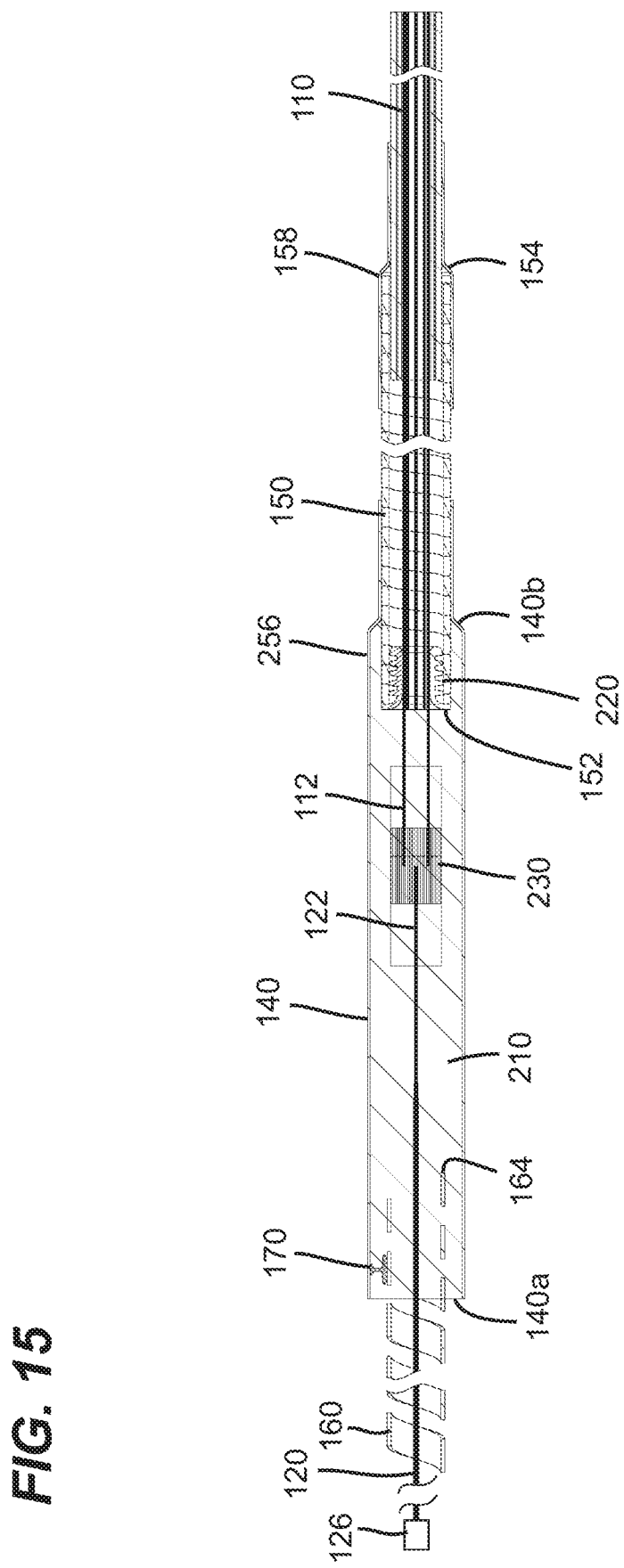
FIG. 15 is a longitudinal cross-sectional view of the second cable assembly of FIG. 14.
Figure 16:
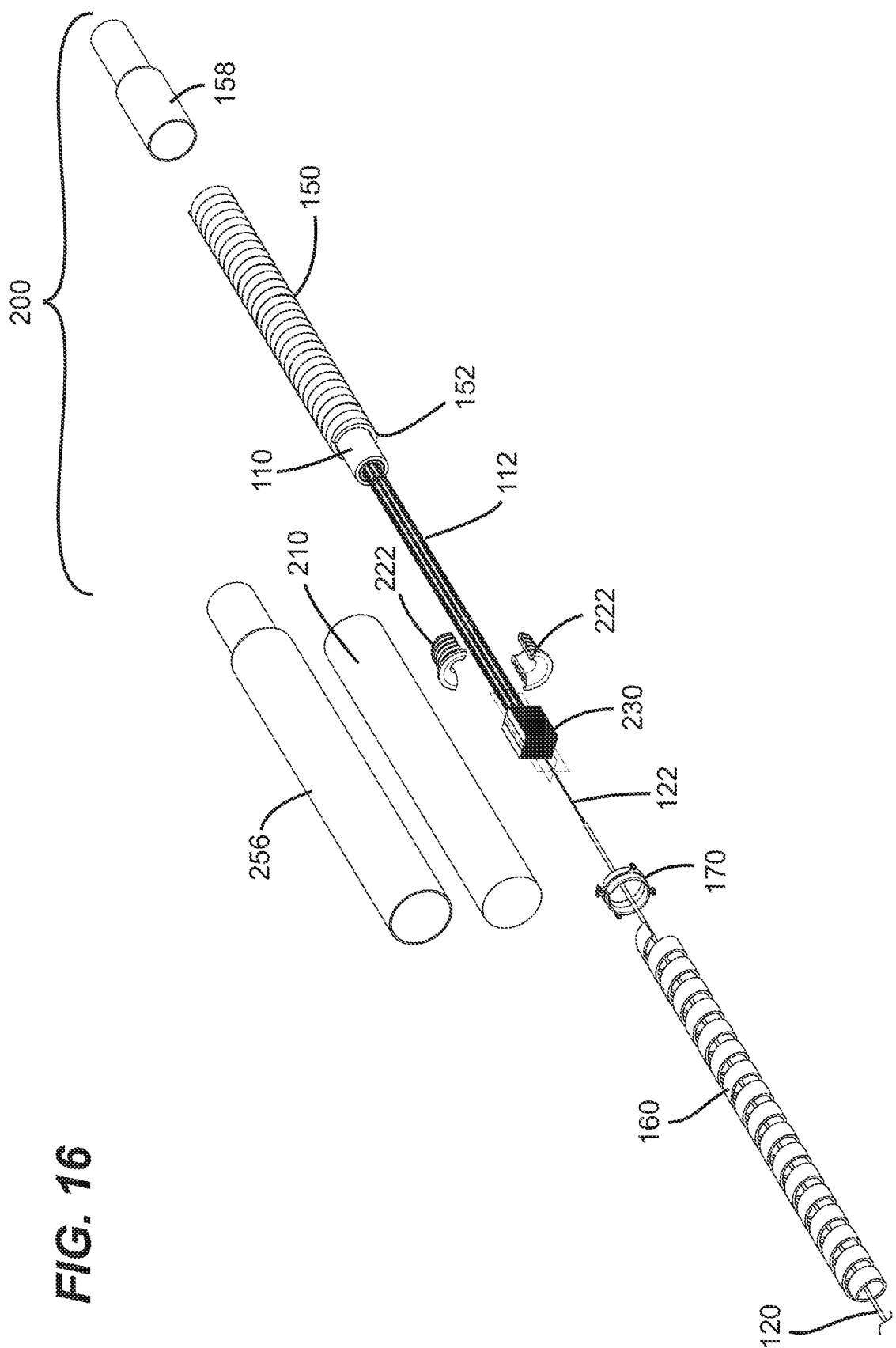
FIG. 16 is a perspective view of the second cable assembly of FIG. 14 with the components exploded from each other for ease in viewing.
Figure 17:
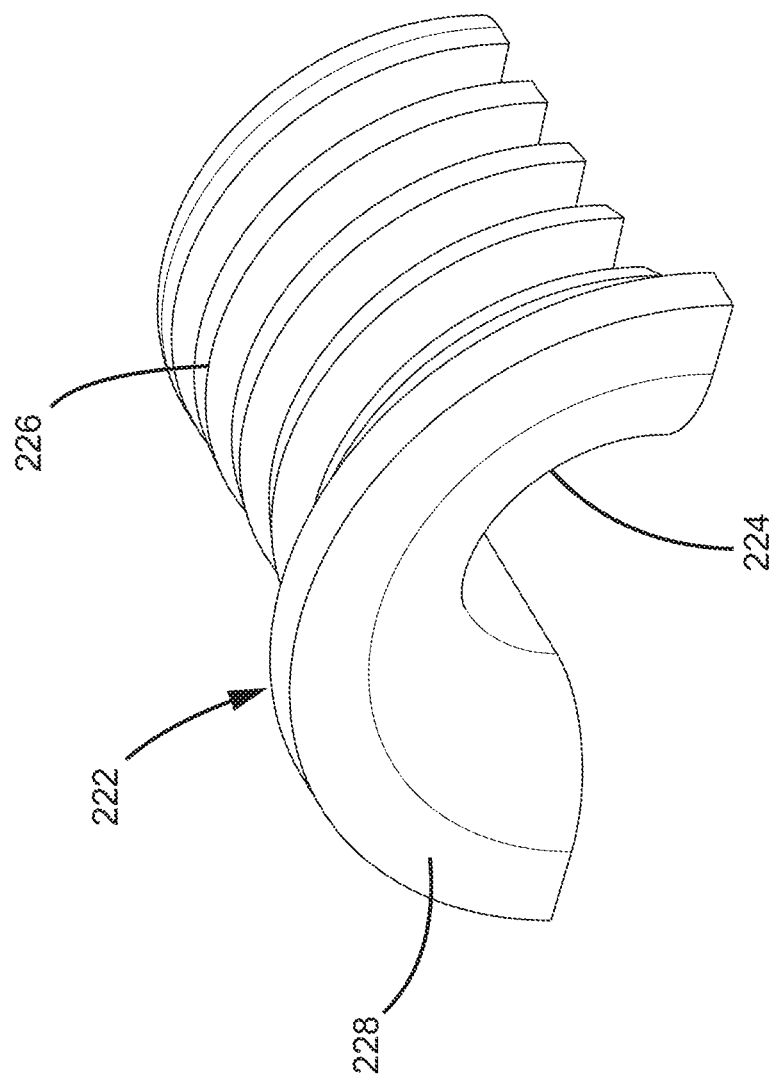
FIG. 17 is a perspective view of an example plug body for an example plug suitable for use with the second cable assembly of FIG. 14.

As shown in FIGS. 14-16, the encapsulation of the cable assembly 200 can include an overmolded body 210 extending between a first axial end 210a and a second axial end 210b. The overmolded body 210 is formed by placing a mold (e.g., a two-piece mold) around the splices 130, the first end 152 of the conduit 150, and the second end 164 of the protective sheath 160. A molding material is injected into the mold and solidifies around the splices 130, conduit first end 152, and sheath second end 164. The mold is then removed from the solidified molding material, leaving the overmolded body 210.

The second cable assembly 200 differs from the cable assembly 100 in that the conduit 150 is coupled to the encapsulation 140 by being embedded within the overmolded body 210 instead of being mounted to an exterior of a housing arrangement 141. Overmolding the body 210 of the encapsulation 140 allows for a greater variety in the size and shape of the encapsulation. Instead of fitting the encapsulated components within a set housing size or within one of a series of set housing sizes, the mold can be set up to accommodate the number of splices 130, trunk fibers 112, and pigtail segments 120 for each given cable assembly.

As with cable assembly 100, in certain implementations, a retention sleeve 256 can be used to further axially retain the conduit 150 at the encapsulation 140. In certain examples, the retention sleeve 256 extends at least partially over the encapsulation 140 and at least partially over the trunk segment 110. In the example shown, the retention sleeve 256 extends fully over the overmolded body 210. In other examples, the retention sleeve 256 may extend over a majority, but less than all, of the overmolded body 210. In still other examples, the retention sleeve 256 extends over only the second end 214 of the overmolded body 210.

Because the first end 152 of the conduit 150 is embedded within the overmold body 210, a plug 220 is disposed at the first end 152 of the conduit 150 to inhibit the overmold material from flowing into the conduit 150. The plug 220 is sized to fill in a gap between the trunk segment fibers 112 and the first end 152 of the conduit 150. In certain implementations, the plug 220 is designed to be laterally mounted around the trunk fibers 112 (e.g., after the trunk fibers 112 are spliced to the pigtail segments 120). In certain examples, the plug 220 includes first and second bodies 222 that cooperate to define a through-passage 224. The through-passage 224 is sized so that the trunk segment fibers 112 fill the through-passage 224 sufficient to inhibit the overmold material from entering the conduit 150 through the through-passage 224.

The plug 220 includes a first section 226 that extends into the conduit 150 from the first end 152. The plug 220 also includes a second section 228 disposed external of the conduit 150. The second section 228 inhibits axial movement of the plug 220 fully into the conduit 150, even when the cable assembly 200 is held vertically. The second section 228 may be contoured (e.g., funnel-shaped). In certain examples, the plug bodies 222 do not attach to each other. Rather, the bodies 222 are held together by the conduit 150.

Figure 18:
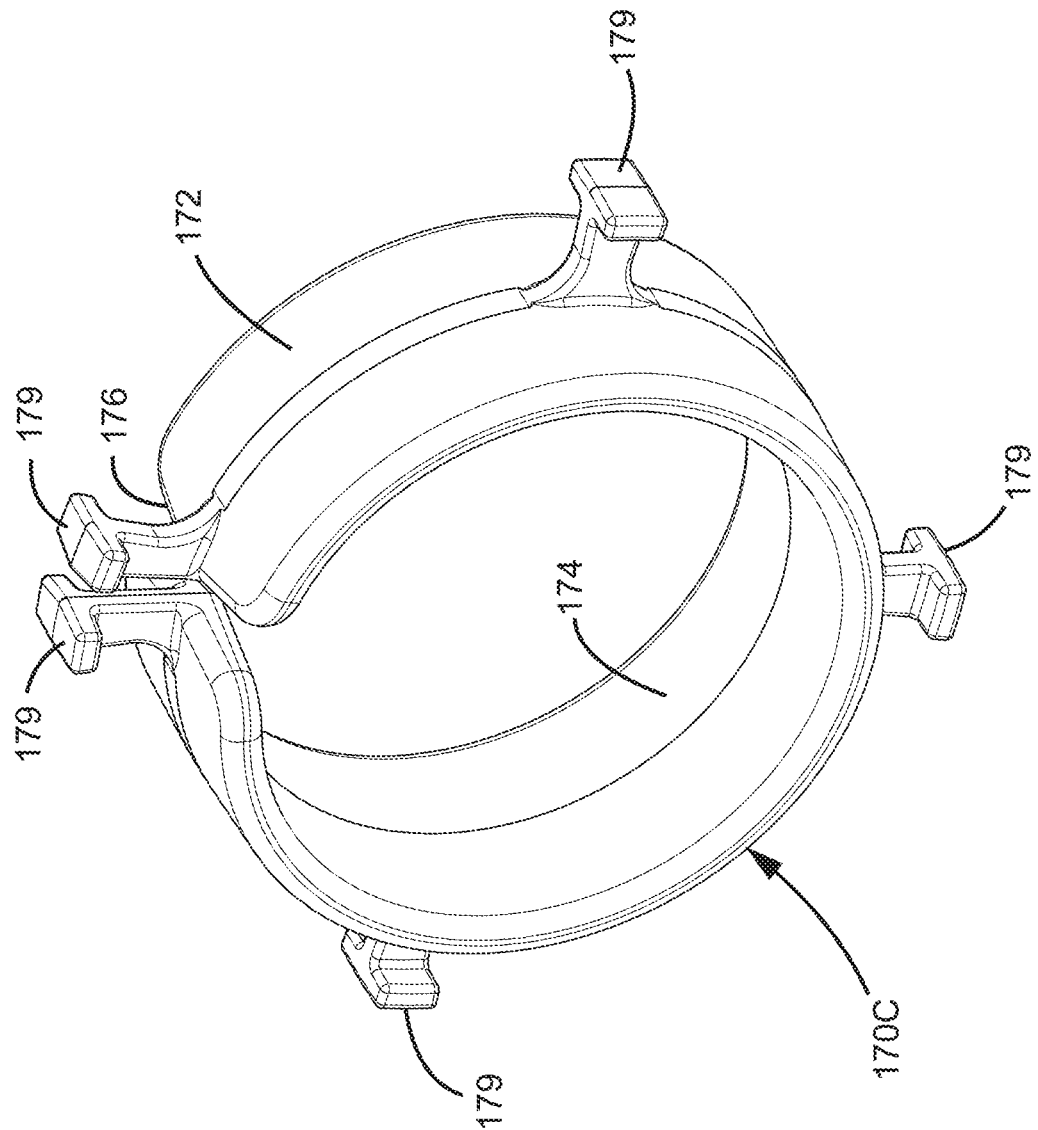
FIG. 18 is a perspective view of a third example ring clip suitable for use with the second cable assembly of FIG. 14.

During the overmolding process, the cable assembly 200 is held vertically with the conduit 150 being disposed beneath the protective sheath 160. Accordingly, the ring clip 170 is not needed as a plug. Instead, the ring clip 170 fits over the protective sheath 160 to hold the protective sheath 160 at a fixed position within the mold to properly position the second end 164 of the sheath 160 within the overmolded body 210. An example ring clip 170C suitable for use with the overmolded body 210 is shown in FIG. 18. The ring clip 170A still includes a body 172, through-passage 174, and slit 176. However, centering tabs 179 extend outwardly from an exterior of the body 172. In certain examples, the centering tabs 179 are sized to contact interior surfaces of the mold to hold the ring clip 179C and contents thereof at a fixed position within the mold.

In the third and fourth example cable assemblies 400, 500, the encapsulation 440, 540 includes a housing arrangement 441, 541 defining a cavity 445, 545 in which the mass fusion splices 430, 530 can be disposed. In certain examples, the cavity 445, 545 can then be filled with fluid material M (e.g., epoxy or other adhesive, molding material, etc.). The housing arrangement 441, 541 defines mounting structure by which the housing arrangement 441, 541 can be secured to a surface (e.g., a panel, a cable, or another such housing arrangement 441, 541). In certain implementations, the mounting structure includes one or more aperture 443, 543 extending through the housing arrangement 441, 541 separate from the cavity 445, 545. In some examples, a cable tie or other wrap/winding structure can extend through the apertures 443, 543 to hold the housing arrangement 441, 541 to the surface. In other examples, the apertures 443, 543 may be sized and shaped to receive fasteners (e.g., bolts, screws, etc.) for holding the housing arrangement 441, 541 to the surface. In some examples, the apertures 443, 543 are sized and configured to match bolt holes on a telecommunications rack when the housing arrangement 441, 541 extends vertically between the first and second ends 440a, 440b, 540a, 540b. In other examples, the apertures 443, 543 are sized and configured to match the bolt holes when the housing arrangement 441, 541 extends horizontally. In other implementations, the mounting structure may include latch arms, pegs, or other mounting members.

In certain implementations, the housing arrangement 441, 541 includes at least a first housing piece 442, 542 and a second housing piece 444, 544 that cooperate to define the cavity 445, 545. Because the housing arrangement 441, 541 is formed from at least two pieces, the housing arrangement 441, 541 can be easily assembled around the mass fusion splices 430, 530. In certain implementations, the housing arrangement 441, 541 also includes a third piece 446, 546. For example, the second housing piece 444, 544 may define one or more apertures 448, 548 providing access to the cavity 445, 545 from an exterior of the housing arrangement 441, 541. In the examples depicted in FIGS. 35 and 40, the second housing piece 444, 544 defines a first aperture 448a, 548a and a second aperture 448b, 548b. The fluid material M may be inserted into the cavity 445, 545 through the aperture(s) 448, 548.

The third housing piece 446, 546 may couple to the second housing piece 444, 544 to close the aperture(s) 448, 548. In some examples, the third housing piece 446, 546 covers multiple apertures 448a, 448b, 548a, 548b. In other examples, each aperture 448a, 448b, 548a, 548b has a respective third housing piece 446, 546. In certain implementations, the third housing piece 446, 546 latches or otherwise secures to the second housing piece 444, 544. In the example depicted in FIGS. 35 and 40, the second housing 441, 541 includes a bridge 447, 547 supporting a peg or other protruding member 449, 549 that friction-fits, latches, or otherwise secures within an aperture defined by the third housing piece 446, 546. In certain examples, the bridge 447, 547 reinforces the second housing piece 444, 544 and/or the third housing piece 446, 546 while the fluid material M is inserted and solidifying. In certain implementations, the third housing piece 446, 546 is installed before or while the material M is solidifying (e.g., the epoxy is curing). In such implementations, the solidified material M can hold the third housing piece 446, 546 to the second housing piece 444, 544. In certain examples, the third housing piece 446, 546 may defines vent holes. In certain examples, the material M is visible through the holes when sufficient material M has been injected into the housing arrangement 441, 541.

In some implementations, the first and second housing pieces 442, 444, 542, 544 are substantially identical except that the second housing piece 444, 544 also defines the aperture(s) 448, 548. In other implementations, the first and second housing pieces are identical and the apertures 448, 548 are initially closed with a punch-out or other removable piece. Each housing piece 442, 444, 542, 544 include an attachment arrangement to hold the housing piece 442, 444, 542, 544 together. In certain examples, at least one of the housing pieces 442, 444, 542, 544 includes latches 308 and at least the other of the housing piece 442, 444, 542, 544 includes catches 310 configured to receive the latches 308. In the example shown, both housing pieces 442, 444, 542, 544 include both latches 308 and catches 310. In the example shown in FIG. 35, the latches 308 are disposed at one side of each housing piece 442, 444, 542, 544 and the catches 310 are disposed at the other side of the housing piece 442, 444, 542, 544.

Each housing piece 442, 444, 542, 544 defines a first region 302, a second region 304, and a third region 306. The first, second, and third regions 302, 304, 306 cooperate to define a respective channel extending axially through each housing piece 442, 444, 542, 544. The channels at the first regions 302 cooperate to define the cavity 445, 545 in which the splices 430, 530 may be disposed. The first regions 302 also cooperate to define one or more pockets 312 at the first end of the cavity 445, 545. One or more wall structures at least partially separate the pockets 312 from the remainder of the cavity 445, 545. The housing pieces 442, 444, 542, 544 define a pocket 312 for each pigtail protective sheath 460, 560 that extends from the first end 440a, 540a of the encapsulation 440, 540.

The second region 304 has a smaller transverse cross-dimension than the first region 302. The second region 304 defines a port 315 through which fluid material M may enter the cavity 445 of the housing arrangement 441. In particular, the fluid material M may enter the second region 304 of the cavity 445, 545. In certain examples, the port 315 may function as a vent to allow air to escape from the second region 304 while fluid material M is being injected into the cavity 445, 545 through the apertures 448, 548. In certain implementations, a protective sheath 460', 560' is disposed about the trunk cable fibers 412, 512 within the conduit 450, 550. The projective sheath 460', 560' inhibits pinching of the trunk fibers 412, 512 while the trunk fibers 412, 512 are disposed within the housing arrangement 441, 541. In certain examples, the protective sheath 460', 560' about the trunk cable fibers 412, 512 is substantially the same as the protective sheath 460, 560 disposed about the pigtail segments 420, 520.

A first end of the protective sheath 460', 560' extends into the encapsulation 440, 540 through the second end 440b, 540b. The first end of the protective sheath 460', 560' is disposed within the second region 304. Fluid material M entering the cavity 445, 545 through the injection port 315 surrounds the first end of the protective sheath 460', 560' to axially secure the protective sheath 460'm 560' to the encapsulation 440, 540 (e.g., see FIGS. 36 and 38). In certain examples, the protective sheath 460', 560' is sized to correspond to an interior of the third region 306 to inhibit the fluid material M from leaking out between an exterior of the protective sheath 460', 560' and the encapsulation 440, 540. In certain examples, the trunk cable fibers 412, 512 fill or substantially fill the interior of the protective sheath 460', 560' to inhibit the fluid material M from leaking out of the encapsulation 440, 540 from an interior of the protective sheath 460', 560'.

The third region 306 has a smaller transverse cross-dimension than the second region 304. The exterior of the third region 306 may include ridges or other texturing. The texturing may aid in holding the conduit 450 to the housing arrangement 441. In certain implementations, the conduit 450 may be further secured to the housing arrangement 441 using a retention sleeve (e.g., a heat-shrink tube) 456. The retention sleeve 456 extends over at least the first region 306 of the housing arrangement 441 and over a portion of the conduit 450 at the first end 452 of the conduit 450. In certain examples, the retention sleeve 456 extends over the second region 304 of the housing arrangement 141, thereby covering the injection port 315.

In use, the cable assembly 100, 200, 400, 500 is manufactured quickly and easily by pre-preparing the pigtail segments 120, 420, 520 and then splicing the pre-prepared pigtail segments 120, 420, 520 to the trunk segment 110, 410, 510. Because the pigtail segments 120, 420, 520 are pre-prepared, the labor and/or resource intensive steps of polishing and testing the connectorization of the pigtail segments can be done ahead of time (e.g., at a dedicated location). Accordingly, the technician(s) manufacturing the cable assembly 100, 200, 400, 500 need not spend time testing the connectorization of the individual fibers. Further, the technician need not spend time threading trunk segment fibers 112, 412, 512 through furcation tubes or otherwise upjacketing the trunk segment fibers 112.

Rather, the cable assembly 100, 200, 400, 500 is manufactured by stripping an end of the trunk segment 110, 410, 510 to expose bare fibers 112, 412, 512 that are sufficiently long to reach a splice machine (e.g., a mass fusion splicer). The retention sleeves 156, 256, 158, 456, 458 are threaded onto the trunk segment 110, 410, 510 prior to splicing. In certain examples, the conduit 150, 450, 550 also is threaded onto the trunk segment 110, 410, 510 prior to splicing.

The pigtail segments 120, 420, 520 are prepared (e.g., pre-prepared at a different location) to have bare fiber segments 122, 422, 522 of sufficient length to splice to the bare fibers 112, 412, 512 of the trunk segment 110, 410, 510. In certain implementations, the trunk fibers 112, 412, 512 and pigtail fibers 122, 422, 522 are sufficiently long to enable re-splicing of the optical fibers 112, 122, 412, 422, 512, 522 if needed. In certain implementations, the trunk fibers 112, 412, 512 and pigtail fibers 122, 422, 522 are sufficiently long to enable re-splicing of the optical fibers 112, 122, 412, 422, 512, 522 multiple times.

In certain implementations, the connectorized ends 126, 426, 526 of the pigtail segments 120, 420, 520 are plugged into testing equipment during the splicing step. Accordingly, a technician can immediately determine whether the splice was successful. If the splice was not successful, then the technician can attempt to re-splice the fibers 112, 122, 412, 422, 512, 522 as needed while still at the splicing machine.

Once the pigtail segments 120, 420, 520 are spliced to the trunk segment 110, 410, 510, the encapsulation 140, 440, 540 is installed around the splices 130, 430, 530. In certain implementations, the splices 130, 430, 530 are all disposed at a common axial position within the encapsulation 140, 440, 540 along the longitudinal axis of the cable assembly 100, 200, 400, 500. In certain implementations, the splices 130, 430, 530 are arranged so that the splices 130, 430, 530 stack together along an axis that is transverse to the longitudinal axis of the cable assembly 100, 200, 400, 500. In certain examples, the splices 130, 430, 530 can be disposed in multiple stacks at the common axial position. In certain implementations, the splices 130, 430, 530 are arranged so that each splice overlaps with at least some of the other splices 130, 430, 530. In certain implementations, the splices 130, 430, 530 are arranged so that each splice overlaps with at least a majority of the other splices 130, 430, 530. In certain implementations, the splices 130, 430, 530 are arranged so that no splice 130, 430, 530 is offset from the other splices 130, 430, 530 by more than a length of the splice 130, 430, 530. In certain implementations, the splices 130, 430, 530 are arranged so that no splice 130, 430, 530 is offset from the other splices 130, 430, 530 by more than half a length of the splice 130, 430, 530.

The conduit 150, 450, 550 is positioned adjacent the splices 130, 430, 530. In some implementations, the conduit 150, 450, 550 defines an axial slit and is laterally installed over the trunk segment 110, 410, 510. In other implementations, the conduit 150, 450, 550 is pre-threaded over the trunk segment 110, 410, 510 prior to splicing the pigtail segments 120, 420, 520 to the trunk segment 110, 410, 510. The protective sheath 160, 460, 560 is laterally installed over the pigtail segments 120, 420, 520. The first end 152, 452 of the conduit 150, 450, 550 and the second end 164 of the protective sheath 160, 460, 560 are appropriately positioned relative to the encapsulation 140, 440, 540. Fluid material (e.g., epoxy or other adhesive, molding material, etc.) M is applied to form the encapsulation 140, 440, 540 with the second end 164 of the protective sheath 160, 460, 560 embedded therein.

In some implementations, the encapsulation 140, 440, 540 is installed by placing the splices 130, 430, 530 within a cavity 145, 445, 545 of a housing arrangement 141, 441, 541. For example, first and second housing pieces 142, 144, 442, 444, 542, 544 can be disposed around the splices 130, 430, 530 to enclose the splices 130, 430, 530. The first end 152 of the conduit 150, 450, 550 may be mounted over a third region 306 of the housing arrangement 141, 441, 541. The second end 164 of the protective sheath 160, 460, 560 is inserted within a ring clip 170 and inserted within the housing arrangement 141, 441, 541. The ring clip 170 is positioned within a pocket 312 within the housing arrangement 141, 441, 541. The fluid material is injected into the cavity 145, 445, 545 through an aperture(s) 148, 448, 548 in the housing arrangement 141, 441, 541. A third housing piece 146, 446, 546 is installed at the aperture(s) 148, 448, 548 to close the cavity 145, 445, 545. The fluid material solidifies as it cures. The solidified material and the housing arrangement 141, 441, 541 cooperate to form the encapsulation 140, 440, 540. In certain examples, a first end of the protective sheath 460', 560'

In other implementations, the encapsulation 140, 440, 540 in installed by orienting the cable assembly 200 vertically so that the splices 130, 430, 530 are disposed above the trunk segment 110, 410, 510 and at least portions of the pigtail segments 120, 420, 520 are disposed above the splices 130, 430, 530. A plug 220 is installed at the first end 152 of the conduit 150, 450, 550. A ring clip 170 is installed about the first end 164 of the protective sheath 160, 460, 560. A mold is assembled around the splices 130, 430, 530, the first end 152 of the conduit 150, 450, 550, and the second end 164 of the protective sheath 160, 460, 560. Molding material is injected into the mold to surround the first end 152 of the conduit 150, 450, 550 and the second end 164 of the protective sheath 160, 460, 560. In some implementations, the mold material also surround the splices 130, 430, 530. The molding material solidifies as it cures to form an overmolded body 210, which defines the encapsulation 140, 440, 540.

In still other implementations, the housing arrangement 141, 441, 541 may remain devoid of encapsulating material and still form a fanout housing around the splices 130, 430, 530, the first end of the conduit 150, 450, 550, and the second end of the protective sheath 160, 460, 560.

The first retention sleeve 156, 256, 456 is slid over the conduit 150, 450, 550 towards the encapsulation 140, 440, 540. A first portion of the first retention sleeve 156, 256, 456 is slid over at least a portion of the encapsulation 140, 440, 540. In some examples, the first portion of the first retention sleeve 156, 456 is slid over the second and third regions 304, 306 of the housing arrangement 141, 441, 541. In other examples, the first portion of the first retention sleeve 256 is slid over the overmolded body 210 (e.g., over an entirety of the overmolded body). A second portion of the first retention sleeve 156, 256, 456 remains over the conduit 150, 450, 550. In certain examples, the first retention sleeve 156, 256, 456 carries adhesive at an internal surface to bond to the encapsulation 140, 440, 540 and/or to the conduit 150, 450, 550. In some examples, the first retention sleeve 156, 256, 456 is thermally reactive and shrinks when heated. In other examples, the first retention sleeve 156, 256, 456 is resilient and shrinks when a spacer is removed.

The second retention sleeve 158, 458 is slid over the trunk segment 110, 410 towards the conduit 150, 450, 550. A first portion of the second retention sleeve 158, 458 is slid over the second end 154 of the conduit 150, 450, 550. A second portion of the second retention sleeve 158, 458 remains over a jacketed portion of the trunk segment 110, 410, 510. In certain examples, the second retention sleeve 158, 458 carries adhesive at an internal surface to bond to the encapsulation 140, 440, 540 and/or to the conduit 150, 450, 550. In some examples, the second retention sleeve 158, 458 is thermally reactive and shrinks when heated. In other examples, the second retention sleeve 158, 458 is resilient and shrinks when a spacer is removed.

As discussed above, in certain implementations, the protective sheath 160, 460, 560 includes a mesh sleeve. The second end 164 of the mesh sleeve 160, 460, 560 is retained at the encapsulation 140, 440, 540. In certain implementations, the first end of the mesh sleeve 160, 460, 560 can be retained at a gland arrangement configured to be plugged into a panel or other structure closer to the connection point for the pigtail connectors 126, 426, 526. The gland arrangement includes latching tabs or other attachment features that allow the gland arrangement to be attached to the panel or other structure.

Figure 19:
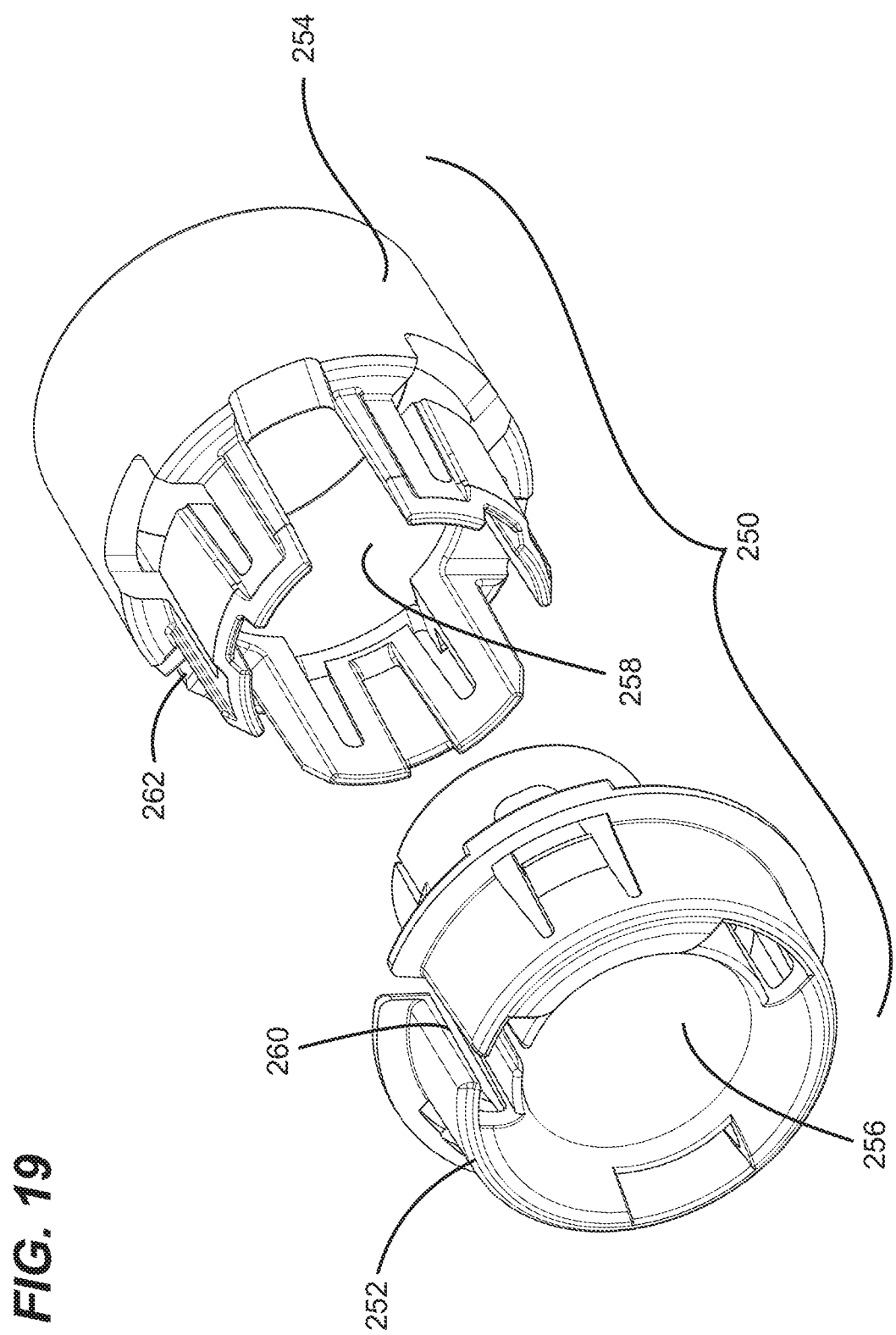
FIG. 19 is a perspective view of an example gland arrangement with a first gland body shown exploded from a second gland body.
Figure 20:
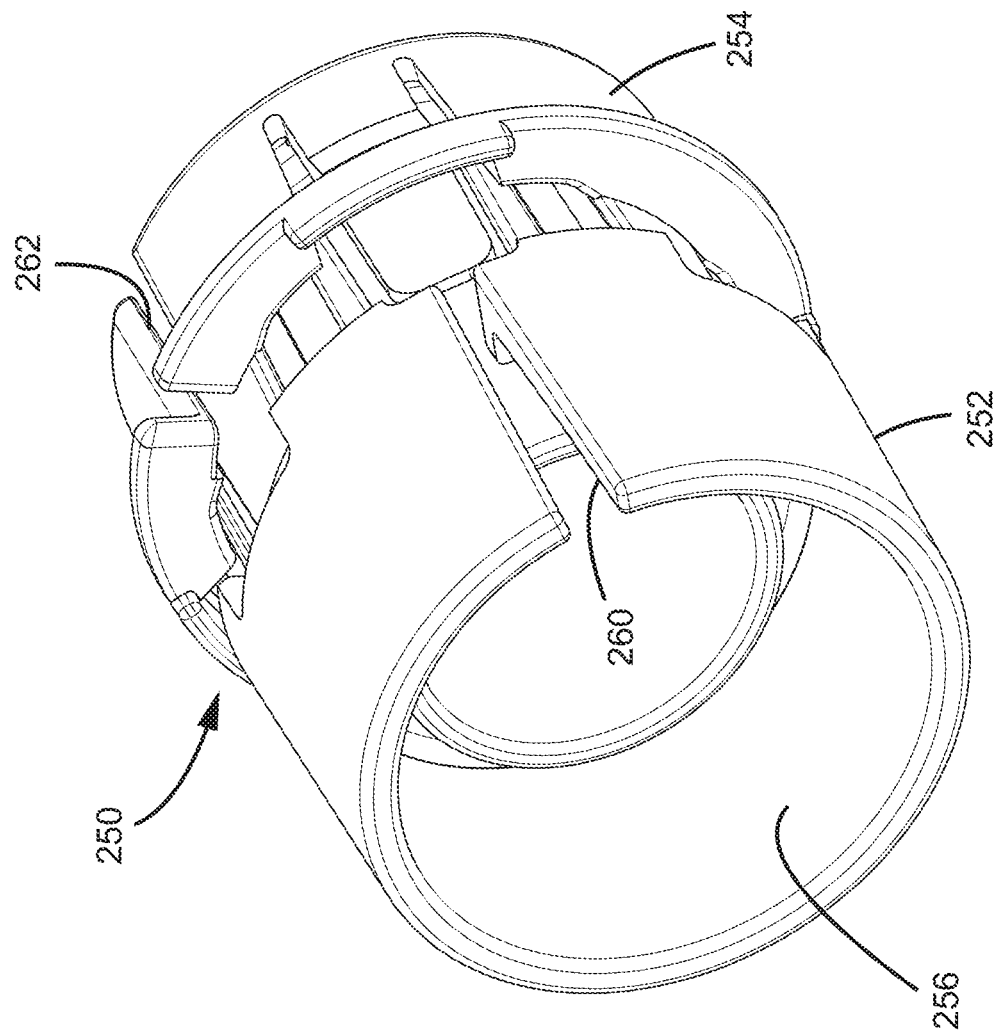
FIG. 20 is a perspective view of the gland arrangement of FIG. 19 in an assembled state.
Figure 21:
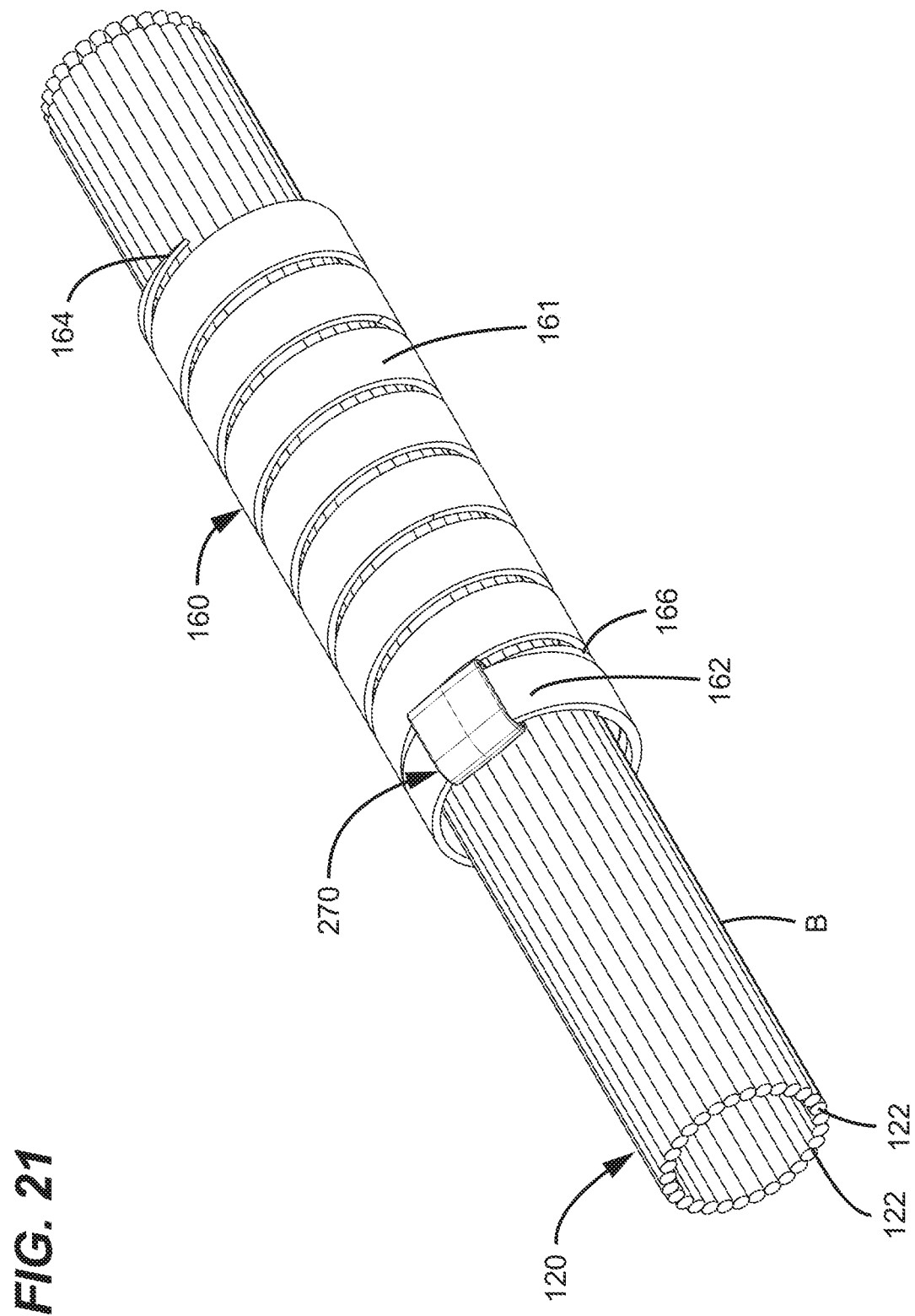
FIG. 21 is a perspective view of an example securement arrangement for one or both ends of a spiral wrap type protective sheath for a bundle of media segments (e.g., optical fibers), the securement arrangement including a conduit.
Figure 22:
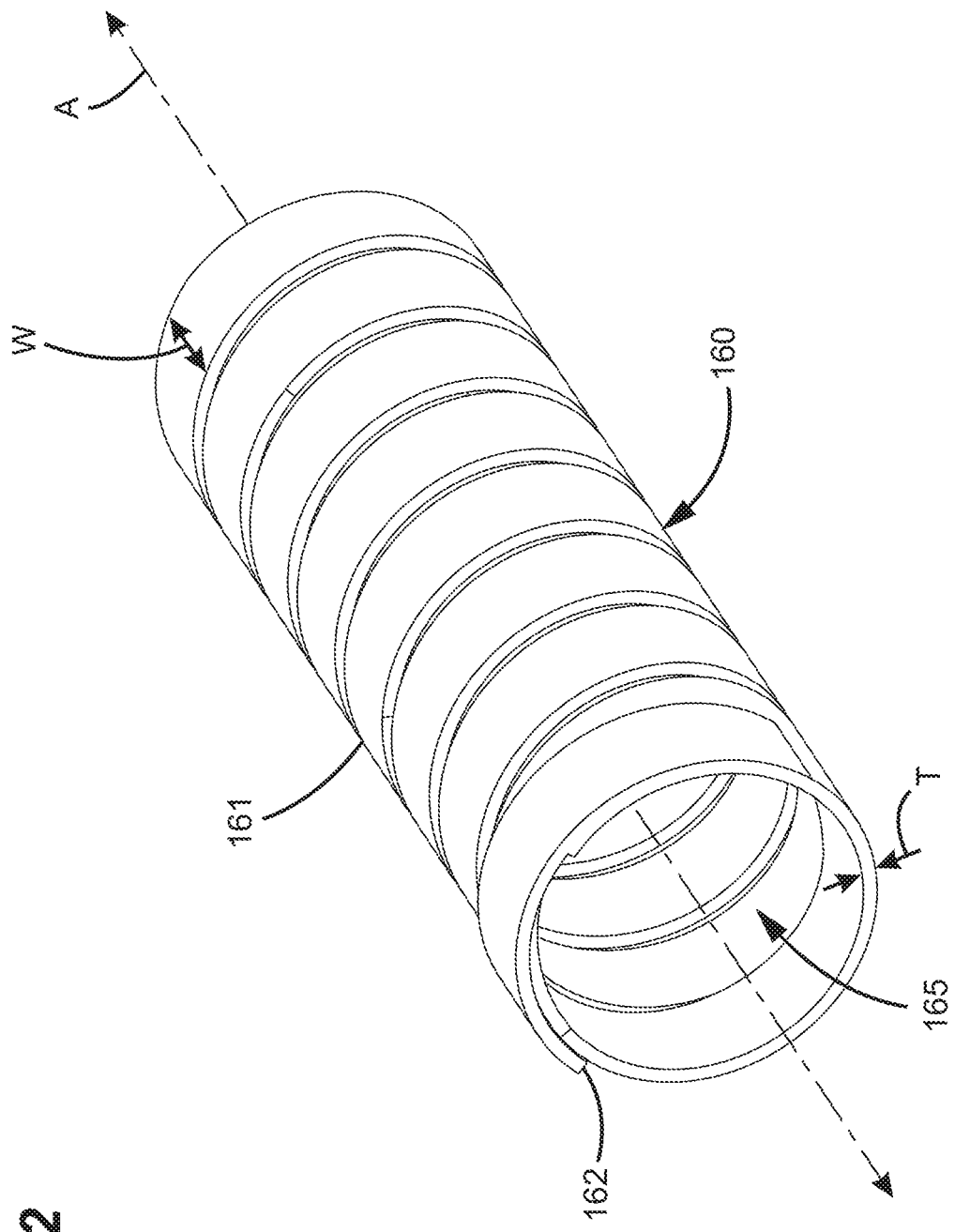
FIG. 22 is a perspective view of an example spiral wrap member suitable for forming a protective sheath around a bundle of media segments.
Figure 23:
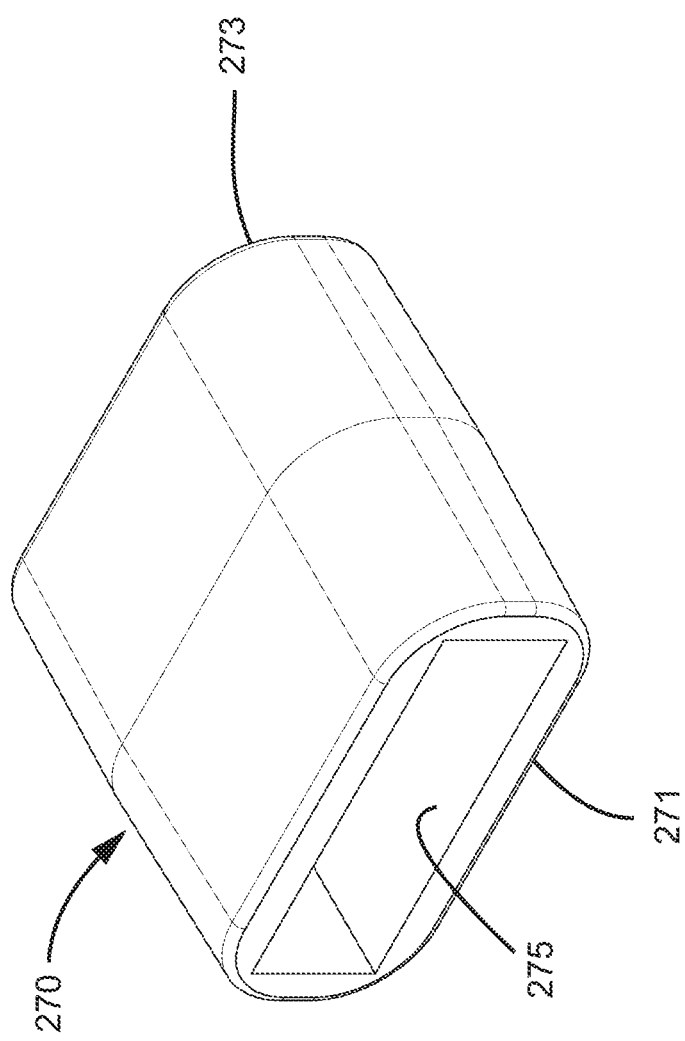
FIG. 23 is a perspective view of an example conduit suitable for use in securing an end of the spiral wrap member of FIG. 22.
Figure 24:
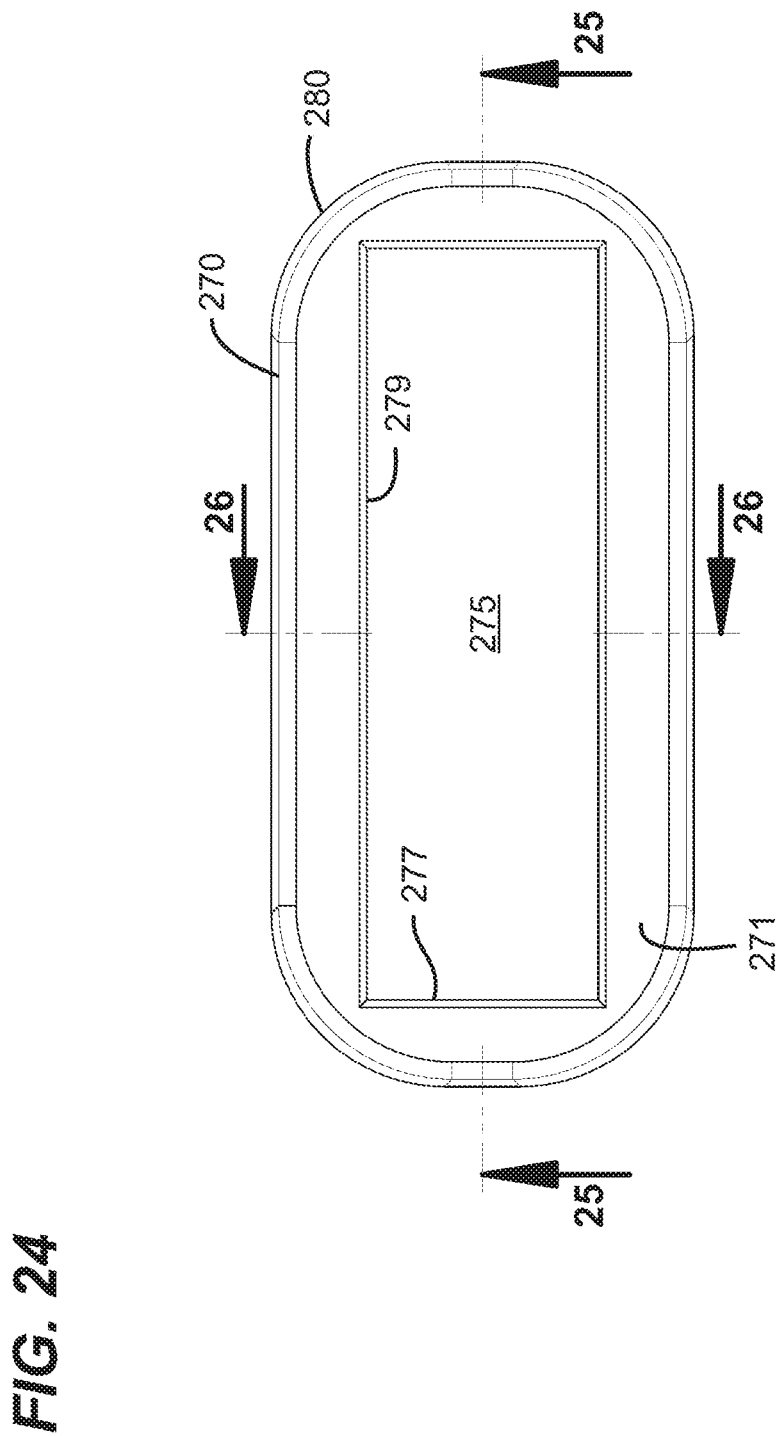
FIG. 24 is an end view of the conduit of FIG. 23.
Figure 25:
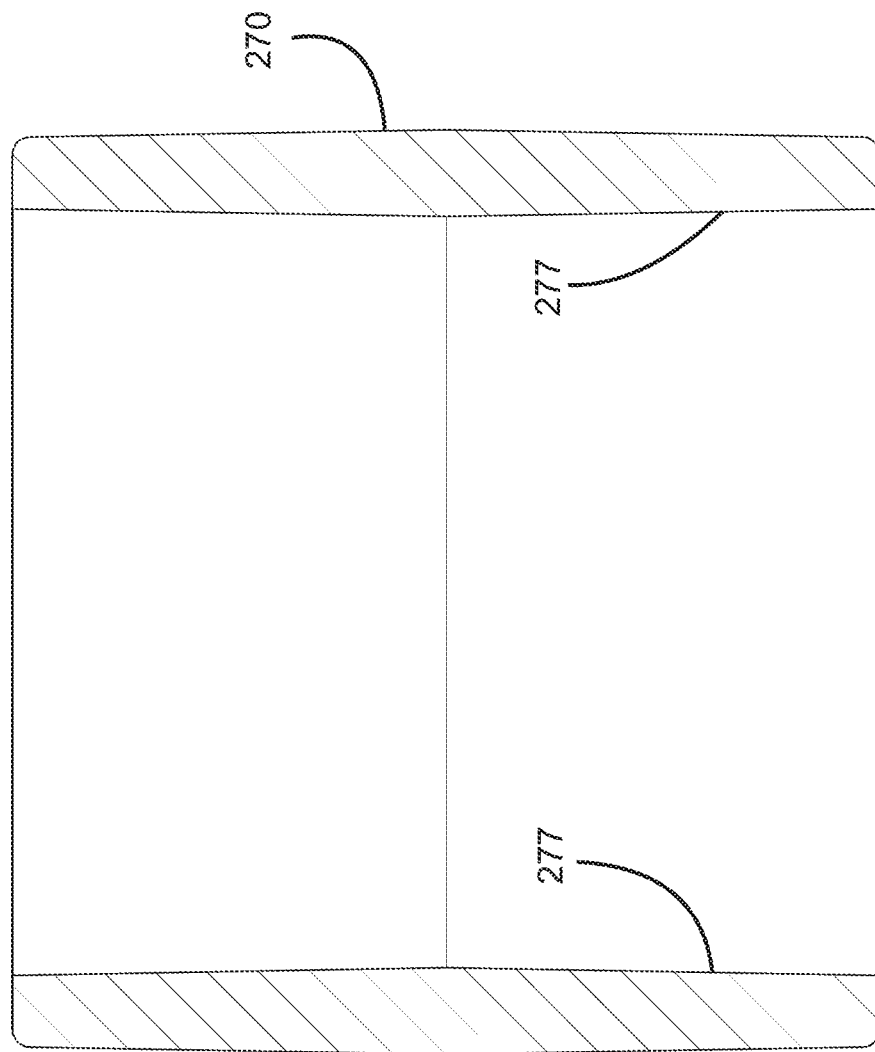
FIG. 25 is a cross-sectional view of the conduit of FIG. 24 taken along the 25-25 line.
Figure 26:
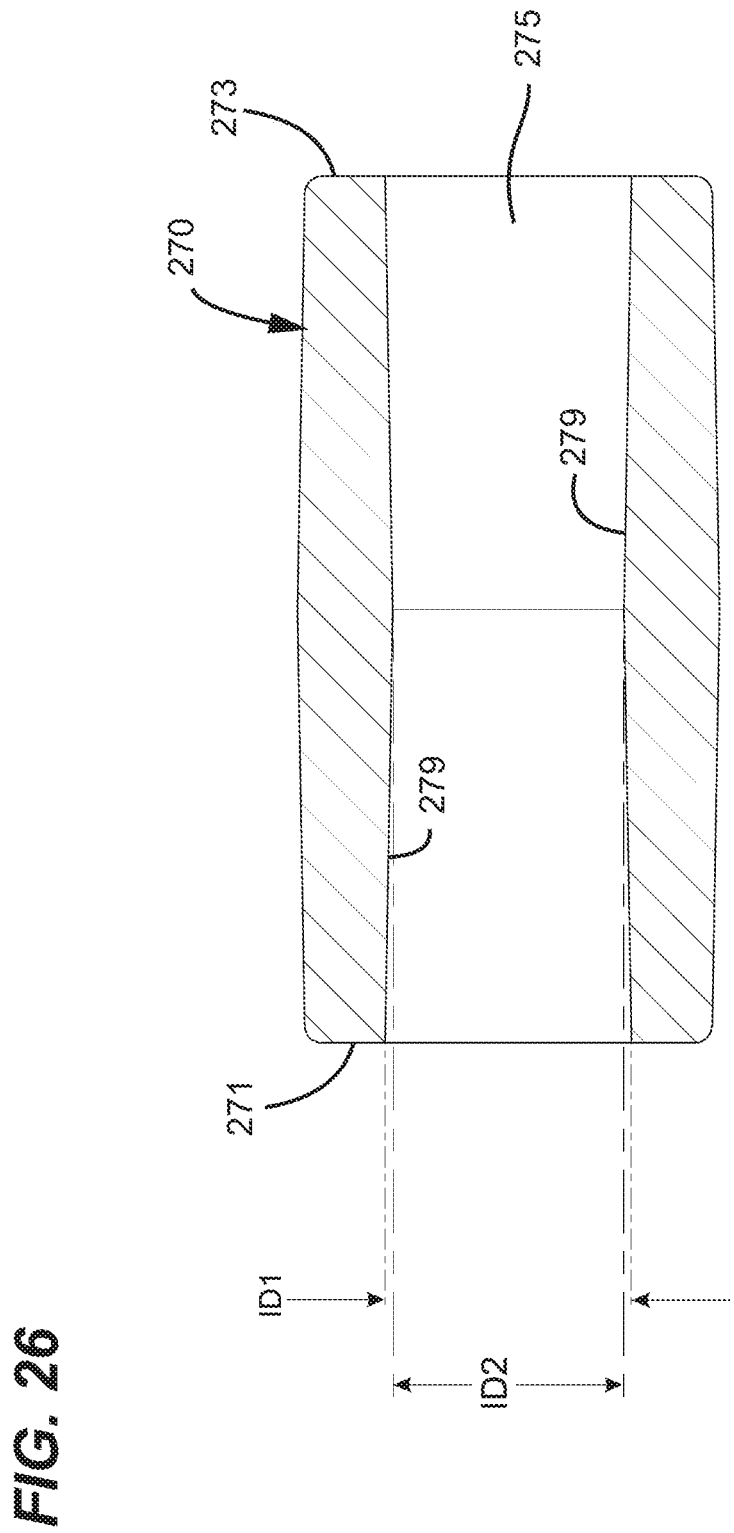
FIG. 26 is a cross-sectional view of the conduit of FIG. 24 taken along the 26-26 line.
Figure 27:
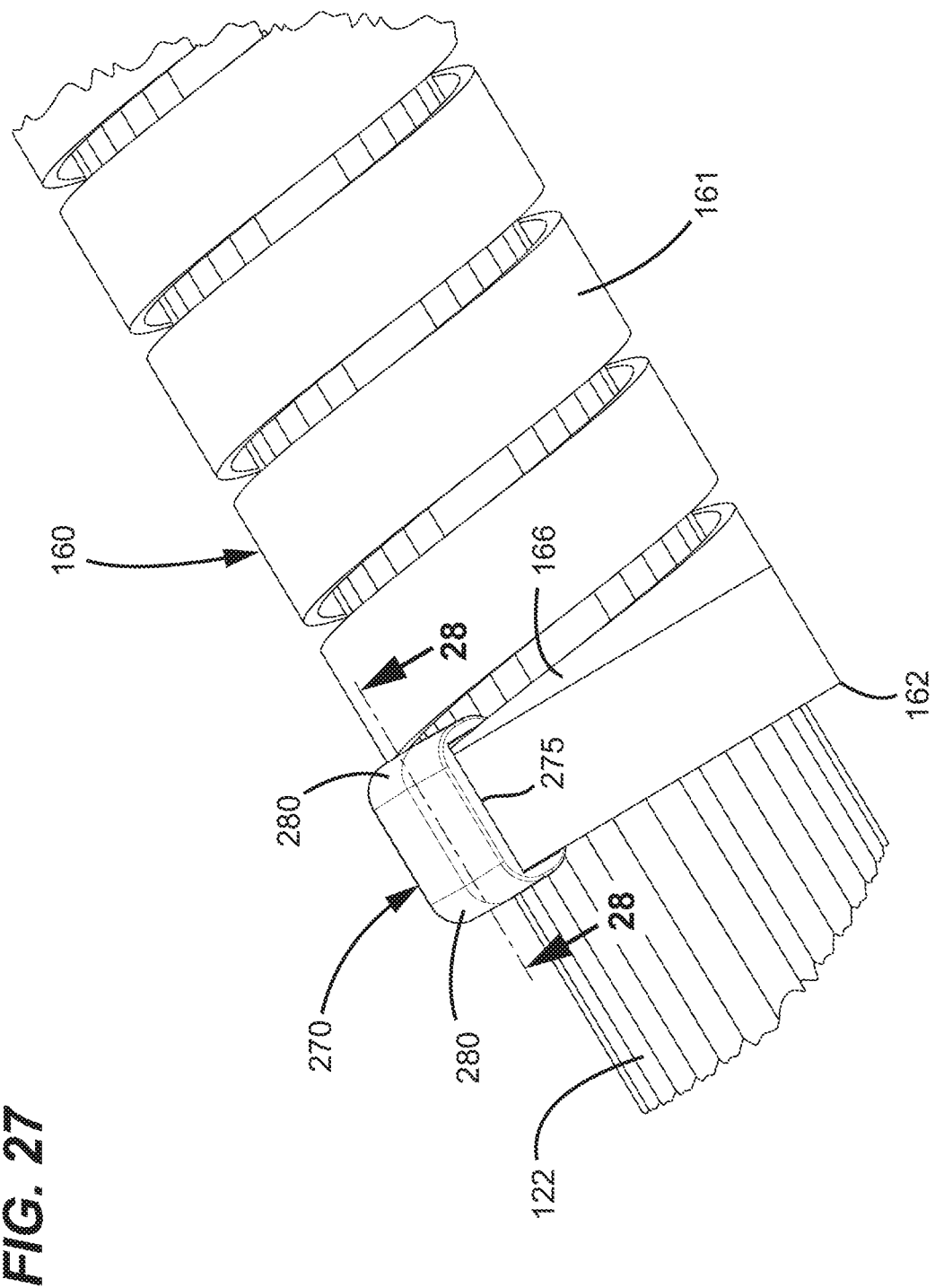
FIG. 27 is an enlarged view of a portion of the securement arrangement of FIG. 21.
Figure 28:
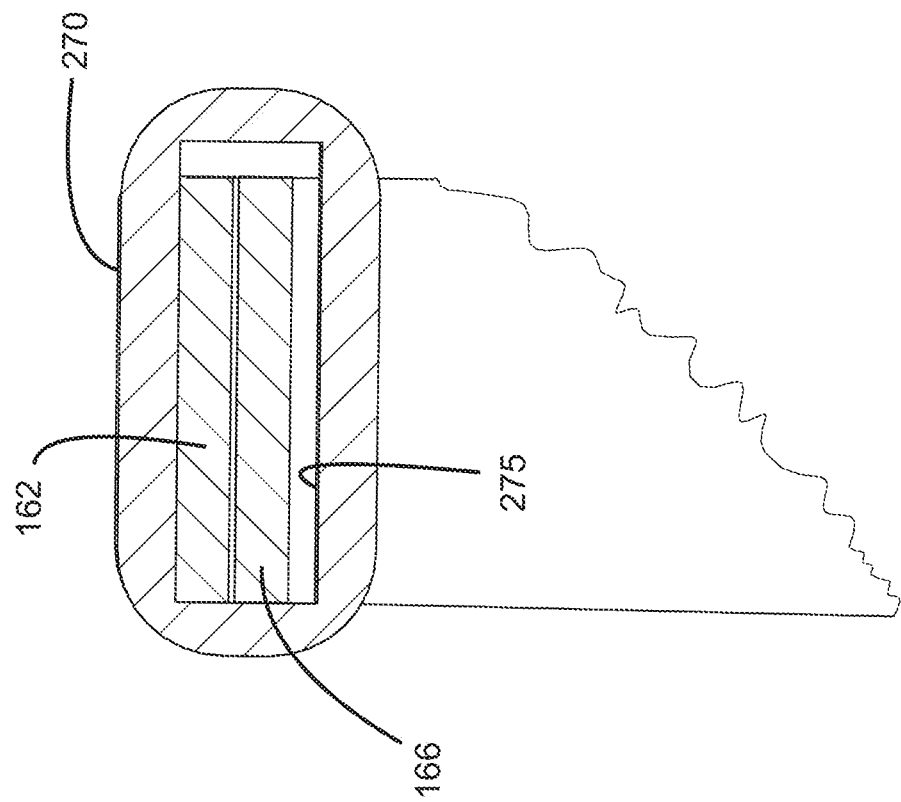
FIG. 28 is a transverse cross-sectional view of the securement arrangement of FIG. 27 taken along the 28-28 line.
Figure 29:
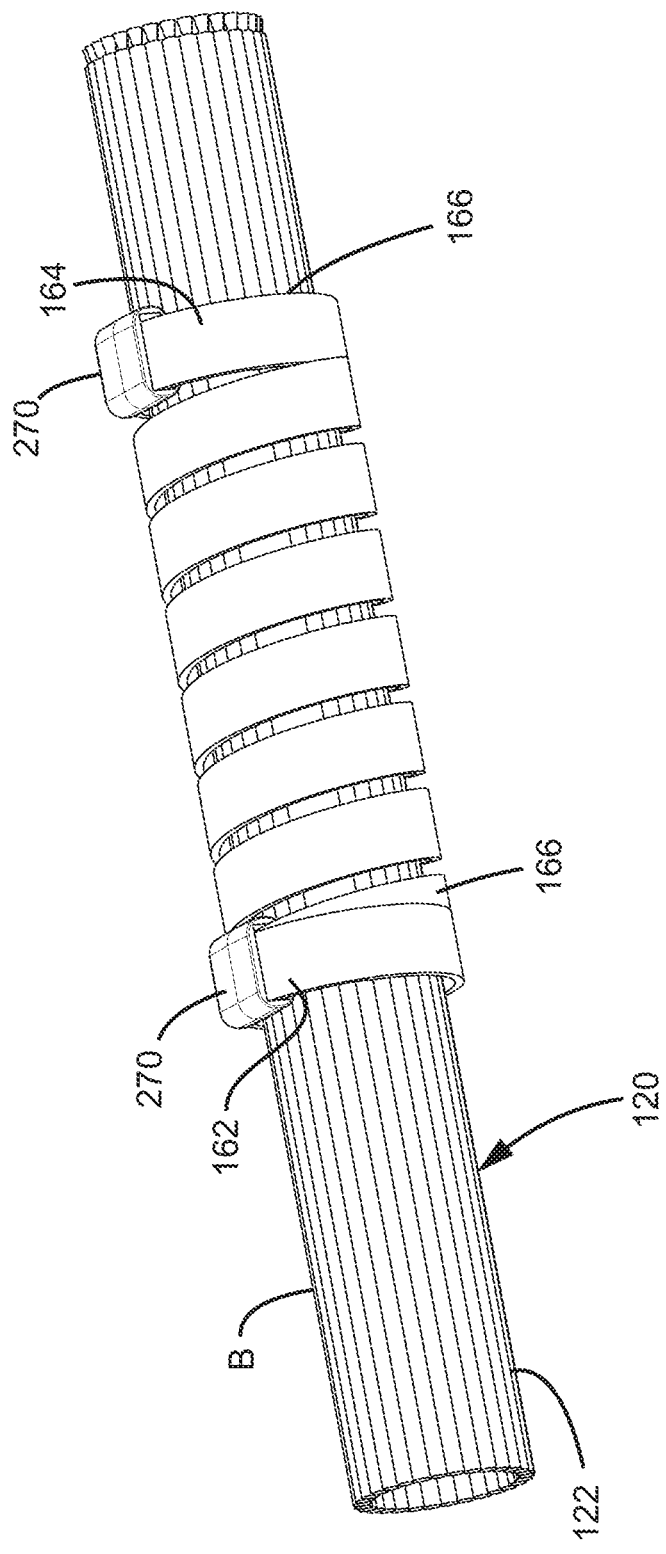
FIG. 29 is a perspective view of another example securement arrangement for both ends of a spiral wrap type protective sheath, the securement arrangement including a respective conduit for each end.

FIGS. 19 and 20 illustrate one example gland arrangement 250 including a first gland body 252 and a second gland body 254 that couple together. Each gland body 252, 254 defines a through-passage 256, 258, respectively. When the gland bodies 252, 254 are assembled together, the through-passages 256, 258 align to provide a through-passage through the gland arrangement 250. In certain examples, the gland bodies 252, 254 latch or otherwise releasably couple together. In certain implementations, the first end of the mesh sleeve 160 can be sandwiched (e.g., radially sandwiched) between the two gland bodies 252, 254.

In certain implementations, each of the gland bodies 252, 254 defines an axial slit 260, 262, respectively, that provides access between an exterior of each body 252, 254 and the respective through-passage 256, 258. The axial slit 260, 262 allows the pigtail segments 120 to be laterally loaded into the gland bodies 252, 254. Accordingly, the pigtail segments 120 can be loaded into the gland bodies 252, 254 without threading the connectorized ends 126 through the through-passages 256, 258. Further, the pigtail segments 120 can be loaded into the gland bodies 252, 254 at any desired time during the manufacture of the cable assembly 100, even after the pigtail segments 120 are spliced to the trunk segment 110.

As shown in FIG. 20, the axial slits 260, 262 are disposed on the gland bodies 252, 254 so that the axial slits 260, 262 are circumferentially offset from each other when the gland bodies 252, 254 are assembled. Rotationally offsetting the slits 260, 262 inhibits the pigtail segments 120 from being pulled out of the gland arrangement 250 after the gland arrangement 250 is assembled.

Referring now to FIGS. 21-32, the protective sheath 160, 460, 560 includes a spiral-wrap member 161 that extends in a spiral configuration about a longitudinal axis A (FIG. 22) extending from a first end 162 to a second end 164. The spiral wrap member 161 has a thickness T extending radially away from the longitudinal axis A and a width W extending along the longitudinal axis A when the wrap member 161 is disposed in the spiral configuration. In some implementations, the thickness T is constant along the width W. In other implementations, the thickness T is larger towards a center of the width W. In certain examples, the wrap member 161 is contoured along the width W so that the thickness T at the center of the width W is larger than the thickness T at the opposite sides of the width W.

The spiral-wrap member 161 defines an internal passage 165 along the longitudinal axis A. The passage 165 is sized so that one or more optical fibers 162 can extend therethrough. In certain examples, a bundle of optical fibers 162 extends through the passage 165 (e.g., see FIG. 21). In some implementations, the second end 164 of the spiral-wrap member is secured to the encapsulation (see FIGS. 2 and 15). In other implementations, the second end 164 may be unattached to the encapsulation 140.

The first end 162 of the spiral wrap member 161 tends to curve towards the fiber bundle extending through the passage 165. In certain cases, the first end 162 may extend partially into the bundle (e.g., between adjacent fibers 162). In other cases, the first end 162 may radially compress fibers 162 or create a pinch point if wrapped around a large fiber bundle. To inhibit such behavior, a securement member is used to manage the first end 162. For example, the securement member holds the first end 162 of the spiral wrap member 161 at a first fixed position external of the fiber bundle. In various examples, the securement member holds the second end 162 at a fixed radial position, a fixed axial position, and/or a fixed circumferential position relative to the fiber bundle.

FIGS. 21-29 show one example securement member implemented as a conduit member 270 disposed at the first end 162 of the spiral wrap member 161. The conduit member 270 holds the first end 162 of the spiral wrap member 161 in the first fixed position (e.g., fixed radial position, fixed axial position, and/or fixed circumferential position) relative to the fiber bundle. In certain implementations, the conduit 270 holds the first end 162 of the spiral wrap member 161 in a fixed position (e.g., fixed radial position, fixed axial position, and/or fixed circumferential position) relative to an intermediate section 166 of the spiral wrap member 161 that is disposed between the first and second ends 162, 164 of the spiral wrap member 161.

The conduit member 270 includes a body defining a passage 275 extending between opposite first and second openings 271, 273 leading to the passage 275. The conduit passage 275 is sized to receive the first end 162 of the spiral wrap member 161 layered over an intermediate section 166 of the spiral wrap member 161. The passage 275 is sized to retain the first end 162 of the spiral wrap member 161 via a friction fit. In certain implementations, the passage 275 has a generally rectangular cross-sectional area. The passage 275 is formed from opposing side walls 277 and opposing end walls 279 that each extend along the passage 275 between the first and second openings 271, 273.

In certain implementations, the passage 275 is sufficiently long to encourage enough contact between the first end 162 and the intermediate section 166 to produce a frictional resistance to movement therebetween. In certain implementations, the sidewalls 277 of the passage 275 are sufficiently short so that the end walls 279 press the first end 162 against the intermediate section 166 in the direction of thickness T of the spiral wrap member 161, thereby enhancing friction between the first end 162 and the intermediate section 166. In certain implementations, the end walls 279 taper laterally inwardly towards a center of the passage 275 (e.g., see FIG. 26) to compress the second end 162 and the intermediate section 166 towards each other within the conduit 270, thereby enhancing friction between the first end 162 and the intermediate section 166.

An exterior of the conduit 270 is shaped to inhibit damage to the fibers 162. In certain implementations, the exterior of the conduit 270 is contoured to avoid sharp edges. For example, the exterior corners 280 of the conduit 270 may be rounded. In certain implementations, the first and second openings 271, 273 may be rectangular. In certain implementations, the conduit 270 is formed from plastic. In certain implementations, the spiral-wrap member 161 is formed from plastic.

In certain implementations, a second conduit member 270 can be disposed at the second end 164 of the spiral wrap member 161 to retain the second end 164 in a fixed position (e.g., fixed radial position, fixed axial position, and/or fixed circumferential position) relative to the fiber bundle B. The second conduit member 270 can be identical to the first conduit member 270. The second conduit member 270 can be utilized if the second end 164 of the spiral wrap member 161 is not otherwise secured at the encapsulation 140. Accordingly, the first and second conduit members 270 can be used in conjunction with the spiral wrap member 161 to secure a bundle of fibers at a location spaced from the encapsulation 140. The conduits 170 and spiral wrap member 161 can even be used to hold a bundle of non-spliced fibers together.

Figure 30:
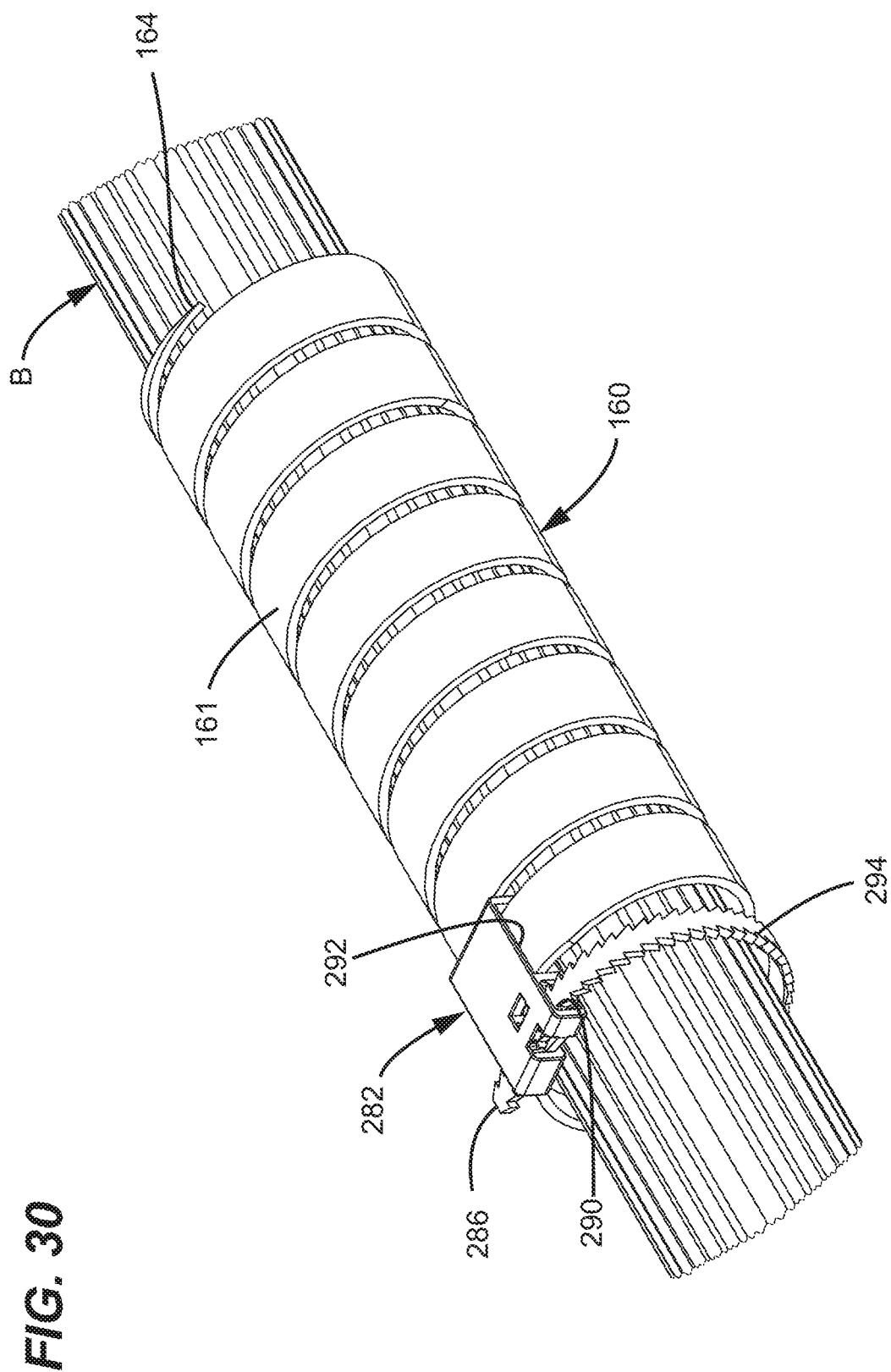
FIG. 30 is a perspective view of another example securement arrangement for one or both ends of a spiral wrap type protective sheath, the securement arrangement including a tie member.
Figure 31:
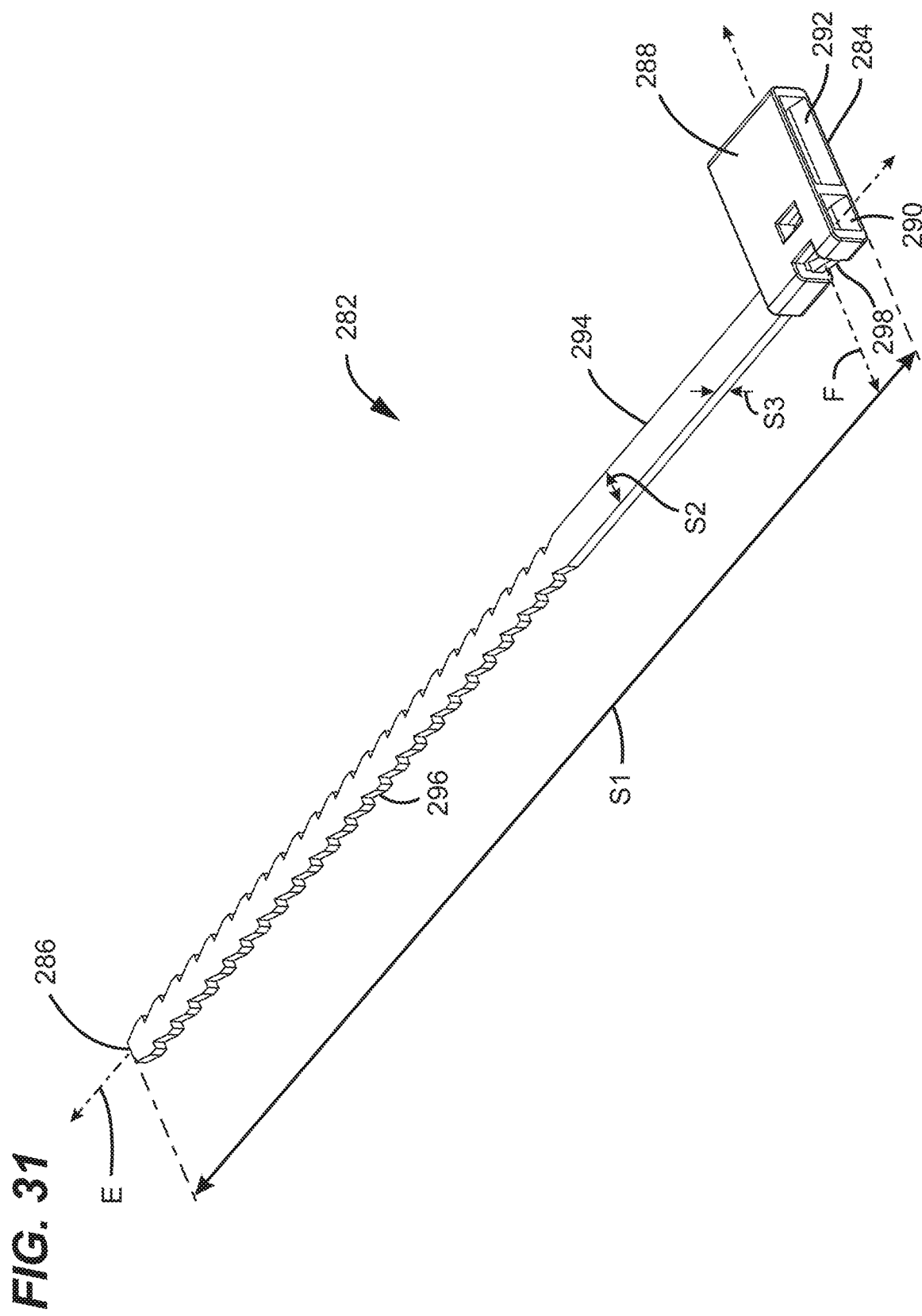
FIG. 31 is a perspective view of the example tie member of FIG. 30 in an unwrapped configuration.
Figure 32:
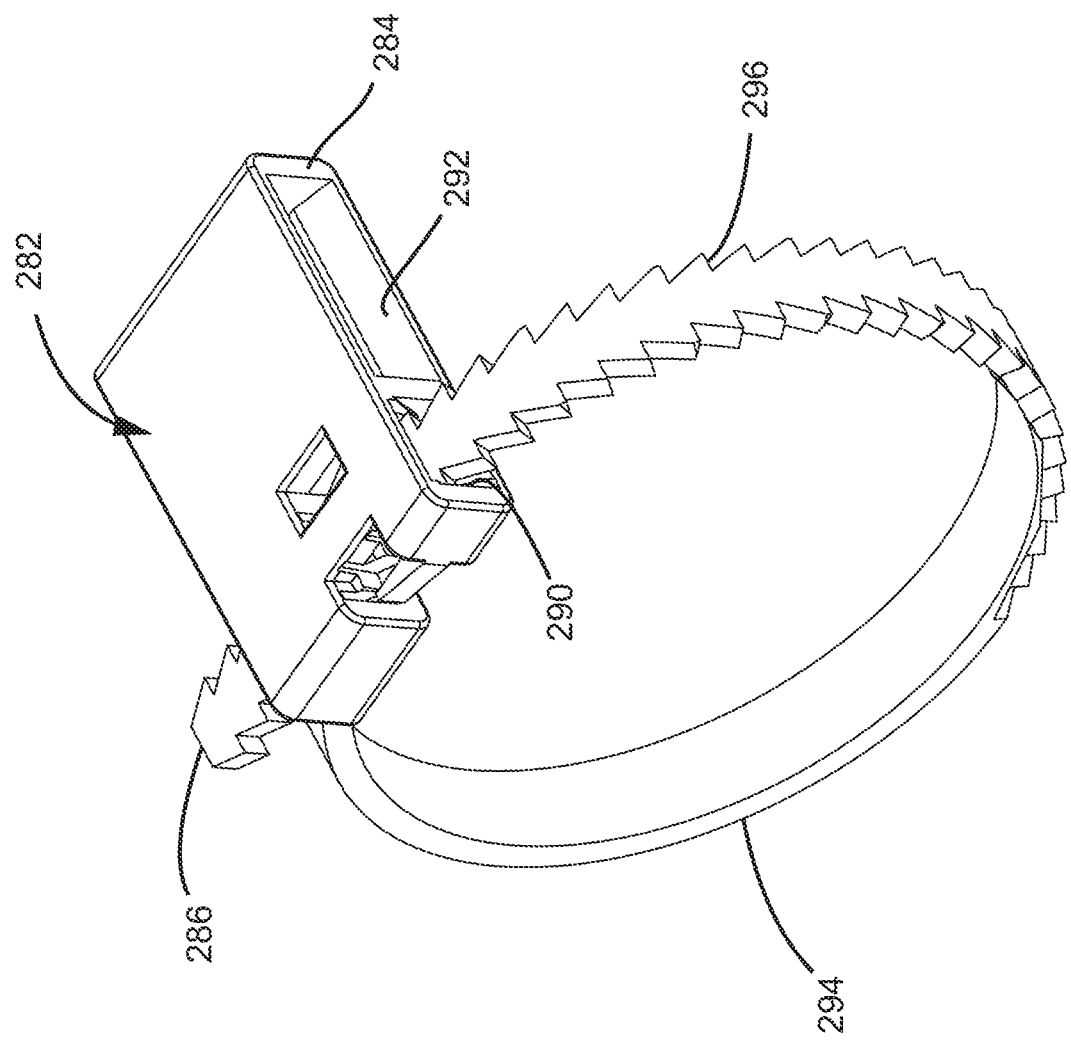
FIG. 32 is a perspective view of the tie member of FIG. 31 in a wrapped configuration.
Figure 33:
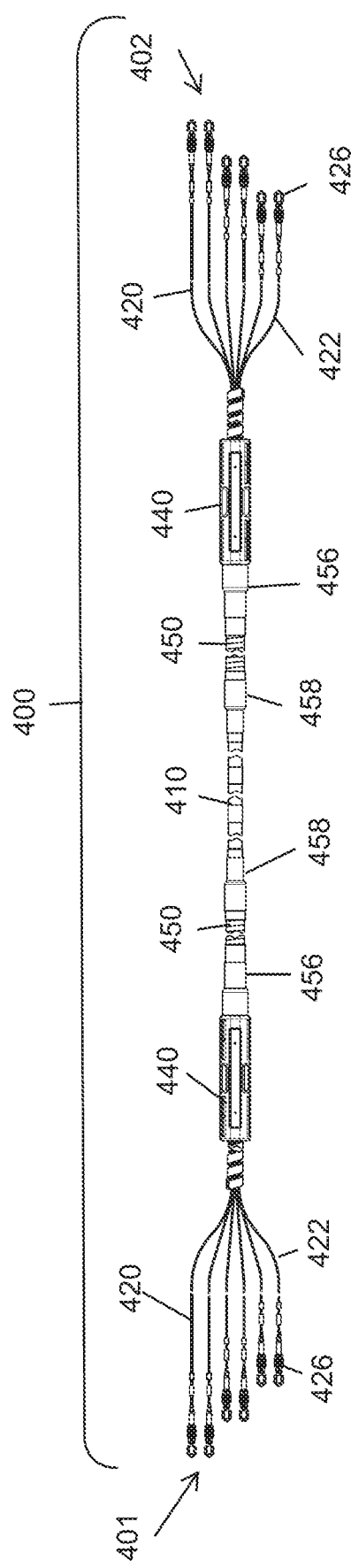
FIG. 33 is a perspective view of an example cable assembly including pigtail segments spliced to opposite ends of a trunk segment, the cable assembly also including first and second fanout housings or encapsulations to protect the optical splices.
Figure 34:
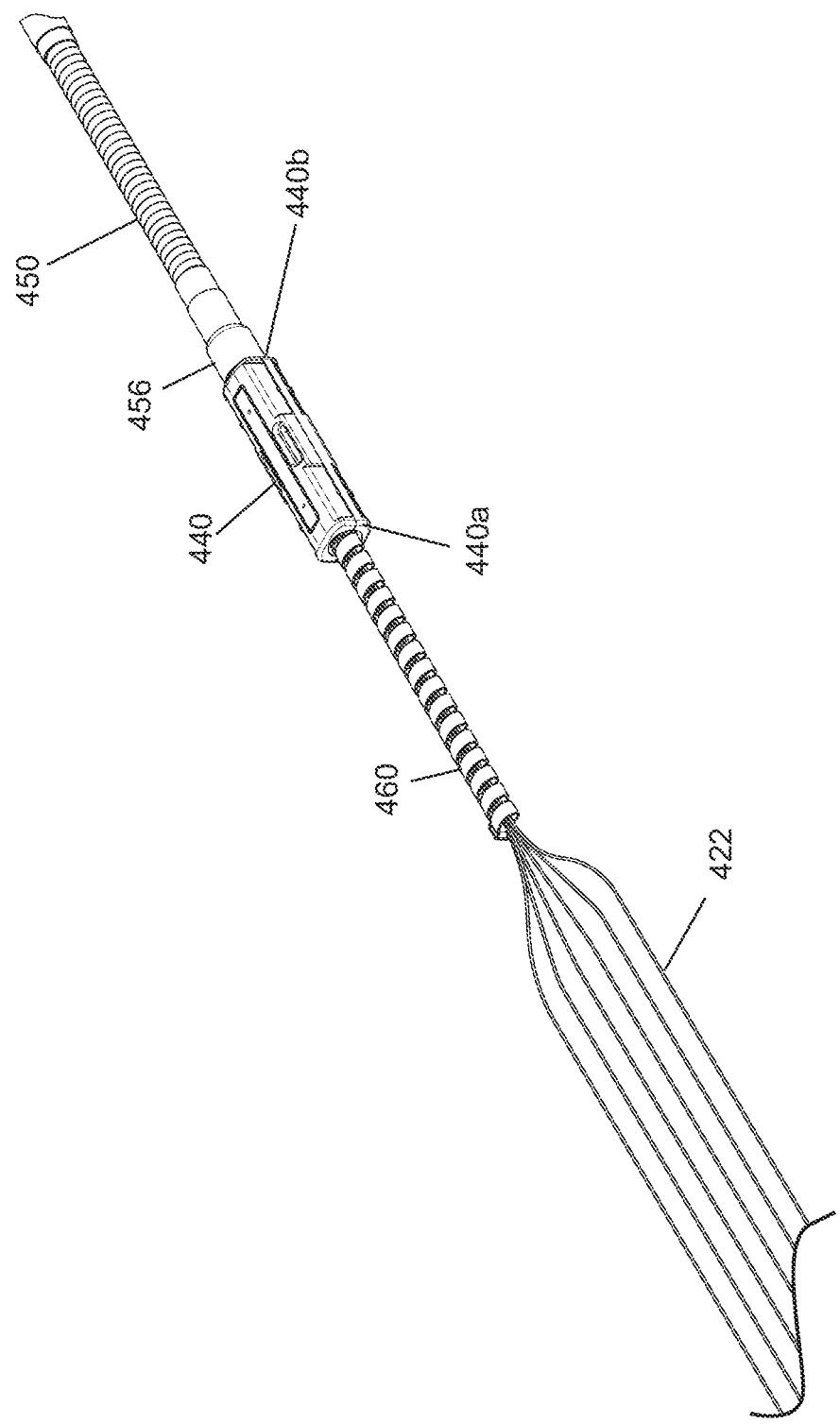
FIG. 34 is a perspective view of a portion of the cable assembly of FIG. 33 where only one of the fanout housings or encapsulations is shown.
Figure 35:
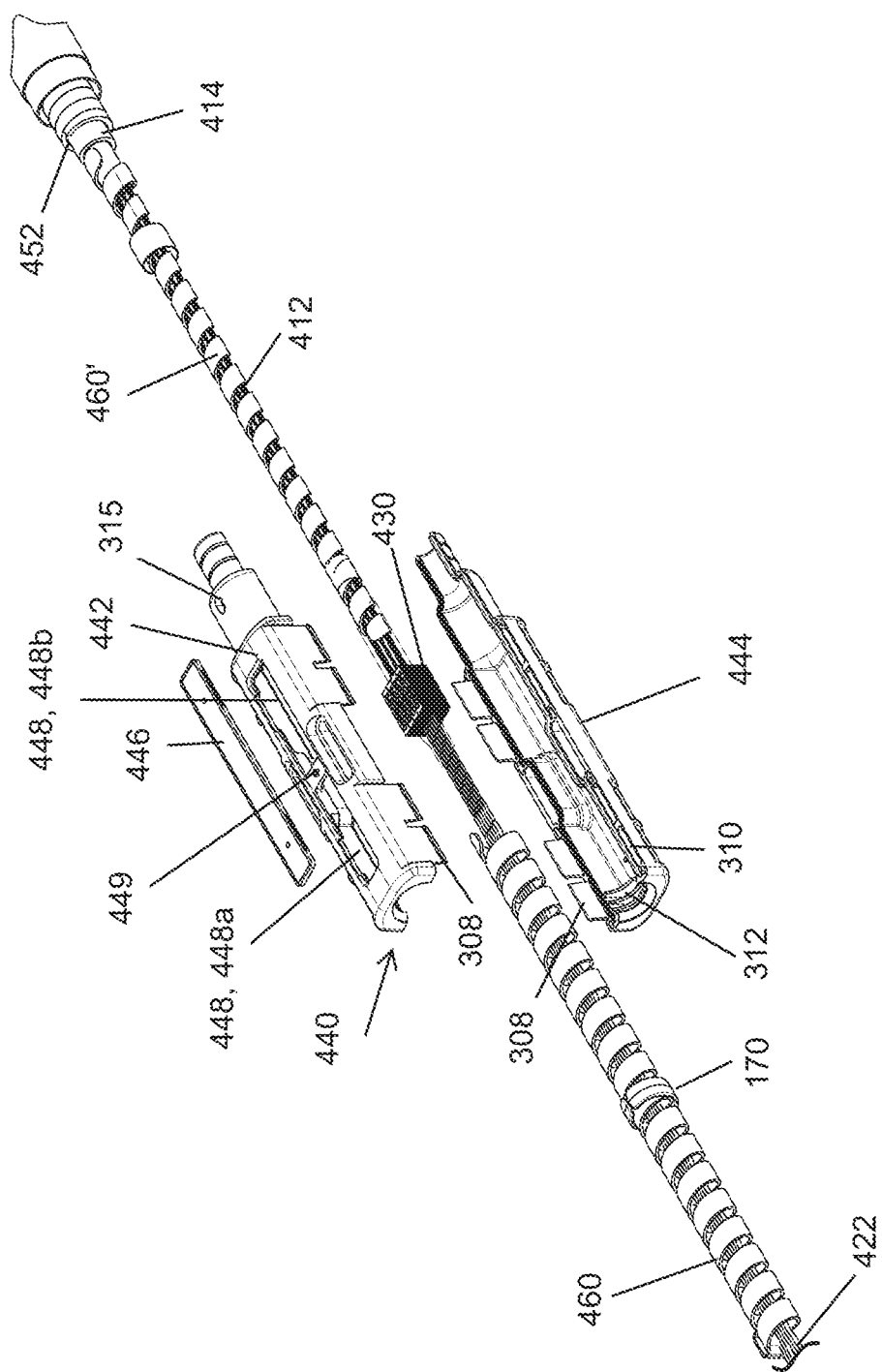
FIG. 35 is a perspective view of the fanout housing or encapsulation of FIG. 34 shown with the components exploded from each other for ease in viewing.
Figure 36:
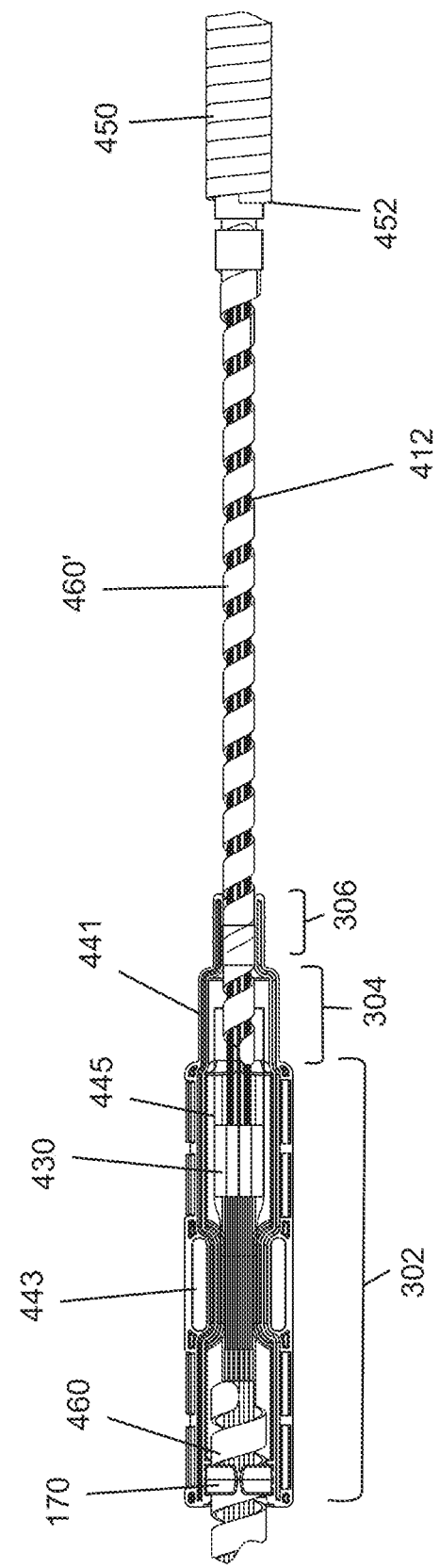
FIG. 36 is a cross-sectional view of the portion of the cable assembly of FIG. 34 with the conduit shown slid away from the fanout housing or encapsulation to expose the protective sheath extending between the trunk cable jacket and the fanout housing or encapsulation.
Figure 37:
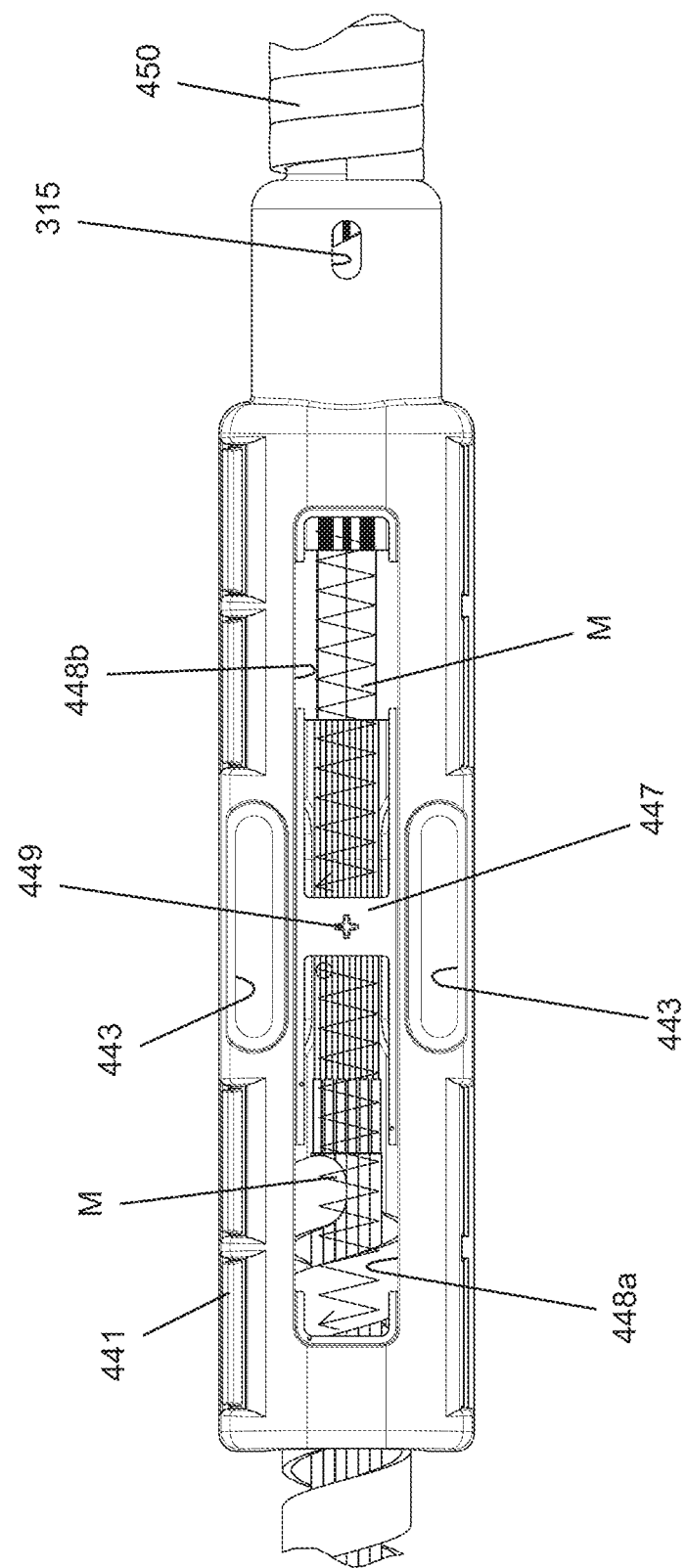
FIG. 37 is a top plan view of the fanout housing or encapsulation of FIG. 34 shown with a third housing piece removed to expose the solidified material through apertures in the fanout housing or encapsulation.
Figure 38:
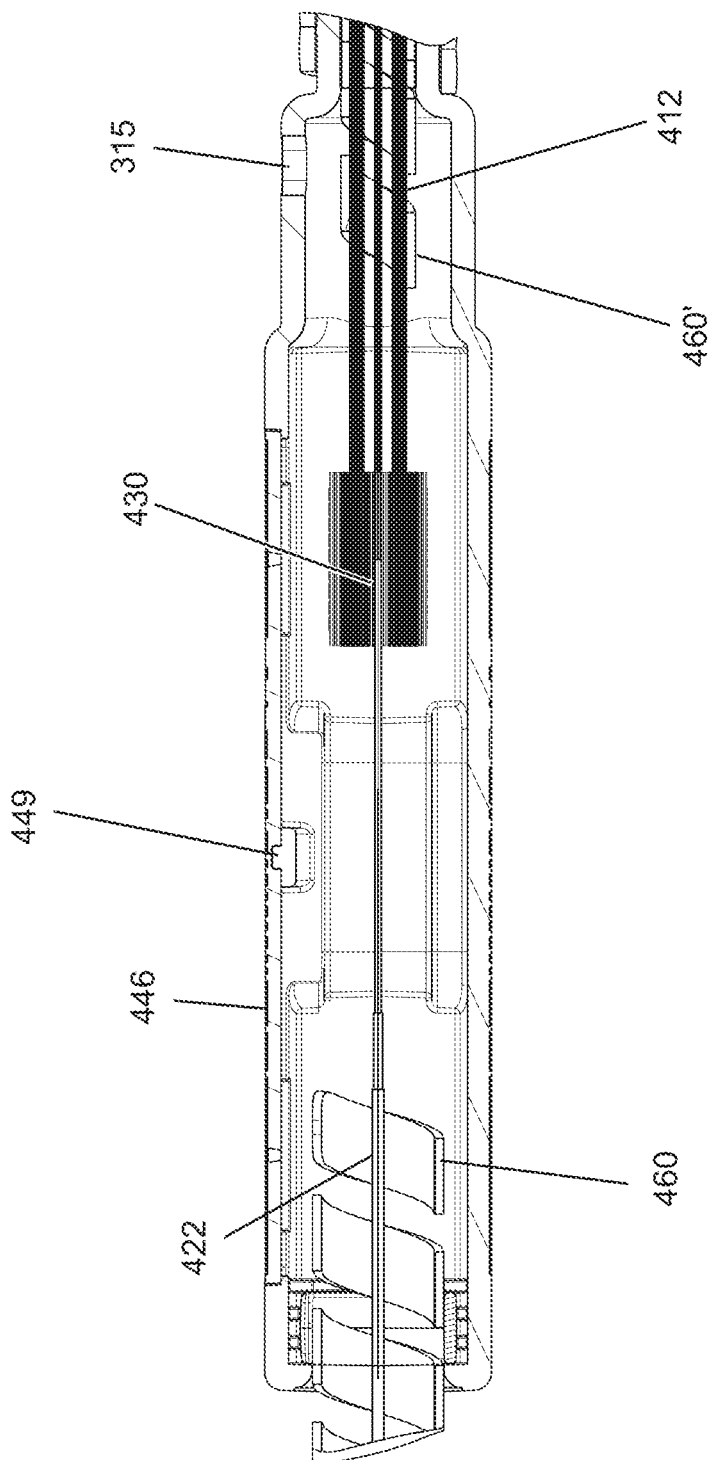
FIG. 38 is a cross-sectional view of a portion of the fanout housing or encapsulation of FIG. 34.

FIGS. 30-32 show another example securement member implemented as a tic member 282 disposed at the first end 162 of the spiral wrap member 161. The tic member 282 holds the first end 162 of the spiral wrap member 161 and fastens around the fiber bundle B to hold the first end 162 external of a circumferential boundary of the fiber bundle B. In certain examples, the tic member 282 holds the first end at a fixed radial position relative to the fiber bundle B. In certain examples, the tie member 282 holds the first end at a fixed circumferential position relative to the fiber bundle B. In certain examples, the tie member 282 holds the first end at a fixed axial position relative to the fiber bundle B.

As shown in FIG. 31, the tie member 282 extends along a first axis E between a head end 284 and an opposite tail end 286. The tie member 282 includes a stem 294 extending from the head end 284 to the tail end 294 along the first axis E. At least a portion of the stem 294 includes a series of teeth 296. The tic member 282 has a length S1 extending along the first axis E, a width S2 extending transverse to the length S1, and a thickness S3 extending transverse to both the length S1 and the width S2. The length S1 is greater than the width S2 and the width S2 is greater than the thickness S3.

The tie member 282 include first and second receptacles 290, 292, respectively, at the head end 284. Each of the first and second receptacles 290, 292 defines a respective passage therethrough. The first receptacle 290 is sized to receive the tail end 286. The stem 294 is configured to enable the stem 294 to pass through the first receptacle 290 in a first direction. The teeth 296 engage catch surfaces at the first receptacle 290 to inhibit movement of the stem 294 in an opposite second direction through the first receptacle 292. Tightening the stem 294 within the first receptacle 290 secures the tie member 282 about the fiber bundle B.

In certain implementations, the passage of the second receptacle 292 is larger than the passage of the first receptacle 290. The second receptacle 292 is sized to receive at least the first end 162 of the spiral wrap member 161. In certain implementations, the second receptacle 292 is sized to enable the first end 162 to be inserted into the passage, but to inhibit axial movement of the stem 294 through the passage of the second receptacle 292. For example, the passage of the second receptacle 292 may about match the thickness S3 of the stem 294 of the tie member 282. In some implementations, the second receptacle 292 has a constant transverse cross-sectional area throughout the passage. In other implementations, the transverse cross-sectional area of the passage is reduced towards a center of the passage to aid in retaining the first end 162 of the spiral wrap member 161 within the second receptacle 292.

The second receptacle 292 is laterally offset from the first axis E along a second axis F that is transverse to the first axis E. The passage of the second receptacle 292 is parallel to, but laterally offset along the width S2 from, the first axis E of the tie member 282. In certain implementations, the first and second receptacles 290, 292 are aligned along the axis F. Accordingly, securing the tie member 282 around an exterior boundary of the fiber bundle B maintains the first end 162 extending through the second receptacle 292 external of the fiber bundle boundary. In certain implementations, the passages defined by the first and second receptacles 290, 292 extend parallel to each other. In some implementations, the first receptacle 290 is aligned with the tail end 286 along the first axis E. In other implementations, the first receptacle 290 is laterally offset from the first axis E along the second axis F in an opposite direction from the second receptacle 292.

In certain implementations, a second tie member 282 can be disposed at the second end 164 of the spiral wrap member 161 to retain the second end 164 in a fixed position (e.g., fixed radial position, fixed axial position, and/or fixed circumferential position) relative to the fiber bundle B. The second tie member 282 can be identical to the first tie member 282. The second tie member 282 can be utilized if the second end 164 of the spiral wrap member 161 is not otherwise secured at the encapsulation 140. Accordingly, the first and second tie members 282 can be used in conjunction with the spiral wrap member 161 to secure a bundle B of fibers at a location spaced from the encapsulation 140. The tie members 282 and spiral wrap member 161 can even be used to hold a bundle B of non-spliced fibers together.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A multi-fiber cable assembly extending axially along a longitudinal axis, the multi-fiber cable comprising:
   a trunk segment including a plurality of optical fibers surrounded by a jacket;
   a plurality of pigtail segments optically coupled to the trunk segment, each pigtail segment including a plurality of optical fibers extending from first ends to second ends, the first ends of each pigtail segment being terminated at a respective multi-fiber connector, the second ends of each pigtail segment being spliced at a respective mass fusion splice to first ends of at least some of the optical fibers of the trunk segment;
   an encapsulation disposed around the mass fusion splices, the encapsulation extending between a first axial end and a second axial end, the mass fusion splices aligning with each other within the encapsulation along an axis that is transverse to the longitudinal axis;
   a conduit disposed around a portion of the trunk segment, the conduit extending along the longitudinal axis between a first end and a second end, the first end of the conduit being fixedly coupled to the encapsulation at the second axial end of the encapsulation; and
   a protective sheathing disposed around at least a portion of the pigtail segments, the protective sheathing extending along the longitudinal axis between a first end and a second end, the second end of the protective sheathing being embedded in the first axial end of the encapsulation.

2. The multi-fiber cable assembly of claim 1, further comprising a ring clip disposed within the encapsulation at the first axial end, the ring clip contacting the protective sheathing, the ring clip defining an axial slit to enable the pigtail segments to be laterally inserted into the ring clip through the slit.

3. The multi-fiber cable assembly of claim 2, wherein the protective sheathing includes a spiral wrap sheath, and wherein the ring clip is disposed around the spiral wrap sheath.

4. The multi-fiber cable assembly of claim 2, wherein the protective sheathing includes a mesh sleeve defining an axial slit, and wherein the ring clip is disposed within the mesh sleeve.

5. The multi-fiber cable assembly of claim 4, wherein the ring clip includes teeth extending radially outwardly to engage the mesh sleeve.

6. The multi-fiber cable assembly of claim 5, wherein the encapsulation holds the mass fusion splices at a common axial position within the encapsulation.

7. The multi-fiber cable assembly of claim 6, wherein the encapsulation includes a housing defining a cavity in which the mass fusion splices are disposed, the cavity being filled with a solidified material.

8. The multi-fiber cable assembly of claim 7, wherein the housing includes at least a first housing piece and a second housing piece that cooperate to define the cavity to enable the mass fusion splices to be laterally inserted into the cavity.

9. The multi-fiber cable assembly of claim 8, wherein the second housing piece defines an injection opening through which the material can be inserted into the cavity, and wherein the housing also includes a third housing piece that couples to the second housing piece to close the injection opening.

10. The multi-fiber cable assembly of claim 7, wherein the ring clip plugs the housing at the first axial end of the encapsulation to hold the material within the housing during solidifying of the material.

11. The multi-fiber cable assembly of claim 6, wherein the encapsulation includes an overmolded body.

12. The multi-fiber cable assembly of claim 11, further comprising a plug disposed about the trunk segment at the first end of the conduit, the plug blocking ingress of the overmolded body into the conduit.

13. The multi-fiber cable assembly of claim 11, wherein the ring clip centers the second end of the protective sheathing within the overmolded body.

14. The multi-fiber cable assembly of claim 1, wherein the conduit includes a corrugated tube.

15. The multi-fiber cable assembly of claim 1, further comprising a first heat-shrink tube that extends over the second axial end of the encapsulation and a portion of the conduit.

16. The multi-fiber cable assembly of claim 15, further comprising a second heat-shrink tube that extends over the second end of the conduit and a portion of the trunk segment.

17. The multi-fiber cable assembly of claim 4, further comprising a gland arrangement disposed about the pigtail segments, the gland arrangement being coupled to a first end of the mesh sleeve, the gland arrangement including external latching features, wherein the gland arrangement includes a first body and a second body that cooperate to sandwich the mesh sleeve therebetween.

18. The multi-fiber cable assembly of claim 17, wherein each of the first and second bodies of the gland arrangement defines an axial slit to enable the pigtail segments to be laterally inserted therein.

19. The multi-fiber cable assembly of claim 18, wherein the axial slit of the first body is circumferentially offset from the axial slit of the second body.

20. The multi-fiber cable assembly of claim 1, wherein a maximum transverse cross-sectional dimension of the encapsulation is no more than 4 inches.

21. The multi-fiber cable assembly of claim 1, wherein a maximum transverse cross-sectional dimension of the encapsulation is no more than 3 inches.

22. The multi-fiber cable assembly of claim 1, wherein a maximum transverse cross-sectional dimension of the encapsulation is no more than 2 inches.

23. The multi-fiber cable assembly of claim 1, wherein the cable assembly is coilable on a spool.

24. The multi-fiber cable assembly of claim 1, wherein the plurality of pigtail segments includes at least six pigtail segments.

25. The multi-fiber cable assembly of claim 1, wherein the plurality of pigtail segments includes at least twenty-four pigtail segments.

26. The multi-fiber cable assembly of claim 1, wherein the plurality of pigtail segments includes at least seventy-two pigtail segments.

27. The multi-fiber cable assembly of claim 1, wherein the plurality of pigtail segments includes at least 144 pigtail segments.

28. The multi-fiber cable assembly of claim 1, wherein the plurality of pigtail segments includes at least 288 pigtail segments.

* * * * *